(12) United States Patent
Ayai et al.

(10) Patent No.: US 10,277,036 B2
(45) Date of Patent: Apr. 30, 2019

(54) INVERTER DEVICE

(71) Applicant: Sumitomo Electric Industries, Ltd., Osaka-shi (JP)

(72) Inventors: Naoki Ayai, Osaka (JP); Kenji Abiru, Osaka (JP); Toshiaki Okumura, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 628 days.

(21) Appl. No.: 14/891,292

(22) PCT Filed: May 22, 2014

(86) PCT No.: PCT/JP2014/063606
§ 371 (c)(1),
(2) Date: Nov. 13, 2015

(87) PCT Pub. No.: WO2014/199795
PCT Pub. Date: Dec. 18, 2014

(65) Prior Publication Data
US 2016/0126742 A1 May 5, 2016

(30) Foreign Application Priority Data
Jun. 11, 2013 (JP) .................. 2013-122934

(51) Int. Cl.
*H02J 3/38* (2006.01)
*H02M 3/158* (2006.01)
(Continued)

(52) U.S. Cl.
CPC .............. *H02J 3/383* (2013.01); *H02J 1/102* (2013.01); *H02J 3/385* (2013.01); *H02M 3/156* (2013.01);
(Continued)

(58) Field of Classification Search
CPC ............ H02J 3/383; H02J 3/385; H02J 1/102; H02M 3/156; H02M 7/44; H02M 3/158; H02M 7/5387; Y02E 10/58
See application file for complete search history.

(56) References Cited

U.S. PATENT DOCUMENTS

| 8,212,409 B2 * | 7/2012 | Bettenwort | H02J 1/102 |
| | | | 307/82 |
| 2005/0105224 A1 * | 5/2005 | Nishi | H02M 3/285 |
| | | | 361/18 |

(Continued)

FOREIGN PATENT DOCUMENTS

| EP | 1 039 620 A2 | 9/2000 |
| EP | 1753634 B1 | 5/2010 |

(Continued)

OTHER PUBLICATIONS

Office Action issued in U.S. Appl. No. 15/032,197, dated May 19, 2017 [Related application, provided in IFW].

(Continued)

*Primary Examiner* — Jared Fureman
*Assistant Examiner* — Emmanuel Dominique
(74) *Attorney, Agent, or Firm* — Baker Botts L.L.P.; Michael A. Sartori

(57) ABSTRACT

An inverter device includes a circuit configuration for converting, to AC power, DC powers respectively given from a first power supply and a second power supply which outputs power with voltage lower than that of the first power supply. The inverter device includes: a first step-up circuit; a second step-up circuit; an inverter circuit connected to both step-up circuits connected in parallel to each other, the inverter circuit configured to convert powers given from both step-up circuits to AC power; and a control unit configured to multiply a power value including the AC power outputted from the inverter circuit, by a ratio of a power value of the (Continued)

DC power of each step-up circuit to a total power value obtained by summing the DC powers of both step-up circuits, and set a current target value for each step-up circuit based on a value obtained by the multiplication.

20 Claims, 15 Drawing Sheets

(51) Int. Cl.
| | | |
|---|---|---|
| *H02J 1/10* | (2006.01) | |
| *H02M 3/156* | (2006.01) | |
| *H02M 7/44* | (2006.01) | |
| *H02M 7/5387* | (2007.01) | |

(52) U.S. Cl.
CPC ............. *H02M 3/158* (2013.01); *H02M 7/44* (2013.01); *H02M 7/5387* (2013.01); *Y02E 10/58* (2013.01)

(56) References Cited

U.S. PATENT DOCUMENTS

| | | | |
|---|---|---|---|
| 2006/0156096 A1 | 7/2006 | Sato | |
| 2006/0250831 A1 | 11/2006 | Li et al. | |
| 2008/0150366 A1 | 6/2008 | Adest et al. | |
| 2009/0121549 A1* | 5/2009 | Leonard | H02M 3/156 307/51 |
| 2009/0140577 A1* | 6/2009 | Fishman | H02M 7/49 307/82 |
| 2010/0091532 A1* | 4/2010 | Fornage | G05F 1/67 363/95 |
| 2010/0156186 A1* | 6/2010 | Kim | H01M 16/003 307/72 |
| 2012/0134191 A1 | 5/2012 | Yoneda | |
| 2012/0201064 A1* | 8/2012 | Asakura | H02M 7/53871 363/98 |
| 2013/0009482 A1 | 1/2013 | Okui | |
| 2013/0043733 A1* | 2/2013 | Frolov | H01L 31/02021 307/82 |
| 2014/0070619 A1* | 3/2014 | Fornage | H02J 3/383 307/82 |
| 2014/0085953 A1 | 3/2014 | Mao | |
| 2014/0104907 A1 | 4/2014 | Shimada et al. | |

FOREIGN PATENT DOCUMENTS

| | | |
|---|---|---|
| EP | 2693288 A1 | 2/2014 |
| EP | 3093972 A1 | 11/2016 |
| JP | 62-200413 | 4/1987 |
| JP | 08-044446 A | 2/1996 |
| JP | 2000-152651 A | 5/2000 |
| JP | 2000-341862 A | 12/2000 |
| JP | 2002-369544 A | 12/2002 |
| JP | 2002-374681 A | 12/2002 |
| JP | 2003-009537 A | 1/2003 |
| JP | 2003-134667 A | 5/2003 |
| JP | 2003-289626 A | 10/2003 |
| JP | 2005-204485 A | 7/2005 |
| JP | 2005-218157 A | 8/2005 |
| JP | 4195948 B2 | 12/2008 |
| JP | 4200244 B2 | 12/2008 |
| JP | 4379959 B2 | 12/2009 |
| JP | 2010-066919 A | 3/2010 |
| JP | 4468371 B2 | 5/2010 |
| JP | 4487354 B2 | 6/2010 |
| JP | 4622021 B2 | 2/2011 |
| JP | 2011-083170 A | 4/2011 |
| JP | 2012-055036 A | 3/2012 |
| JP | 2003-348768 A | 12/2013 |
| JP | 5618022 B1 | 11/2014 |
| JP | 5618023 B1 | 11/2014 |
| WO | 2005/115788 A1 | 12/2005 |
| WO | WO-2006/033142 A1 | 3/2006 |
| WO | 2012/132948 A1 | 10/2012 |

OTHER PUBLICATIONS

Davis, "SiC Transistor Basics: FAQs" Retrieved from http://www.powerelectronics.com/print/11365, XP055408593, Oct. 9, 2013, 9 Pages [Cited in EESR].
Extended European Search Report in related European Patent Application No. 14811023.2, dated Jan. 31, 2017.
International Search Report in International Application No. PCT/JP2014/083736, dated Mar. 17, 2015.
International Search Report in International Application No. PCT/JP2014/063610, dated Jul. 15, 2014.
International Search Report in International Application No. PCT/JP2014/083731, dated Mar. 17, 2015.
U.S. Appl. No. 14/890,882, filed Nov. 12, 2015 [Co-pending application, provide in IFW].
U.S. Appl. No. 15/032,197, filed Apr. 26, 2016 [Co-pending application, provided in IFW].
Office Action in Japanese Patent Application No. 2014-104326, dated Jun. 24, 2015.
Patent Examination Report in Australian Patent Application No. 2014279387, dated Jan. 28, 2016.
Extended European Search Report in related European Patent Application No. 14811444.0, dated Feb. 7, 2017.
International Search Report in International Application No. PCT/JP2014/063606, dated Jul. 15, 2014.
Notice of Allowance issued in U.S. Appl. No. 15/032,197, dated Oct. 20, 2017 [Related Application; Provided in IFW].
Wang et al., "Novel Three-Phase Three-Level-Stacked Neutral Point Clamped Grid-Tied Solar Inverter With a Split Phase Controller," IEEE Transactions on Power Electronics, Institute of Electrical and Electronics Engineers, USA, vol. 28, No. 6, Jun. 1, 2013, pp. 2856-2866, XP011476364, ISSN; 0885-8993, DOI:10.1109/TPEL.2012.2226475 [Cited in Search Report issued in counterpart European Patent Application No. 14 903 937.2, dated May 14, 2018.].

* cited by examiner

INVERTER DEVICE

TECHNICAL FIELD

The present invention relates to an inverter device for converting DC power from a DC power supply such as photovoltaic generation to AC power.

BACKGROUND ART

Conventionally, inverter devices have been used which have a system interconnection function for converting input power from a DC power supply such as a solar battery or a storage battery to AC power and superimposing the converted AC power onto an AC system such as commercial power.

Such an inverter device includes a step-up circuit for stepping up voltage of input power, and an inverter circuit for converting output of the step-up circuit to AC power.

As such an inverter device, the following inverter device is proposed. The step-up circuit is caused to perform switching operation only during a period in which voltage of AC power to be outputted is equal to or greater than voltage of input power, and switching operation of the step-up circuit is stopped during a period in which the voltage of the AC power to be outputted is equal to or smaller than the voltage of input power, whereby a potential difference in stepping down by the inverter circuit is reduced, loss due to switching in the step-up circuit is reduced, and power can be outputted with increased efficiency (see, for example, Patent Literature 1).

CITATION LIST

Patent Literature

PATENT LITERATURE 1: Japanese Laid-Open Patent Publication No. 2000-152651

SUMMARY OF INVENTION

Technical Problem

For example, in the case of using a photovoltaic panel as the DC power supply, a plurality of solar battery arrays each composed of a plurality of connected photovoltaic panels (modules) may be connected in parallel to the inverter device.

In the case of using a plurality of solar battery arrays as described above, the number of the modules may be different among the solar battery arrays, or a sunshine condition or the like may be different among the solar battery arrays. As a result, an optimum operation point differs among the solar battery arrays, whereby a problem arises that each solar battery array cannot be operated at an optimum operation point.

Considering the above, in the case of connecting a plurality of solar battery arrays, the following method may be employed: a plurality of step-up circuits to which the solar battery arrays are respectively connected are provided, and the step-up circuits are connected in parallel to the inverter device. By this method, an operation point of each solar battery array can be controlled using each step-up circuit, whereby each solar battery array can be controlled to operate at an optimum operation point.

However, under the configuration in which a plurality of step-up circuits are provided, in the case of performing control so that switching operations of the step-up circuits and the inverter circuit are alternately stopped as proposed in Patent Literature 1, power to be given to the inverter circuit when switching of the step-up circuits is stopped is supplied from only an array that is outputting power with the highest voltage among the arrays. This is because, when the switching of each step-up circuit is stopped, the step-up circuit directly outputs, to the inverter circuit, power outputted from the array connected to the step-up circuit.

As a result, supply of power cannot be obtained from the other modules having relatively low voltages.

Therefore, maximum power cannot be obtained from each solar battery array, and power generation efficiency might be reduced.

The present invention has been made in view of the above circumstances, and an object of the present invention is to provide an inverter device that can suppress reduction in power supply efficiency.

Solution to Problem

The present invention is an inverter device including a circuit configuration for converting, to AC power, DC powers respectively given from a first power supply and a second power supply which outputs power with voltage lower than that of the first power supply, the inverter device including: a first step-up circuit configured to step up voltage of the DC power given from the first power supply; a second step-up circuit configured to step up voltage of the DC power given from the second power supply; an inverter circuit connected to both step-up circuits connected in parallel to each other, the inverter circuit configured to convert powers given from both step-up circuits to AC power; and a control unit configured to multiply a power value including the AC power outputted from the inverter circuit, by a ratio of a power value of the DC power of each step-up circuit to a total power value obtained by summing the DC powers of both step-up circuits, and set a current target value for each step-up circuit based on a value obtained by the multiplication.

Further, the present invention is an inverter device including a circuit configuration for converting, to AC power, DC powers respectively given from a first power supply and a second power supply which outputs power with voltage lower than that of the first power supply, the inverter device including: a first step-up circuit configured to step up voltage of the DC power given from the first power supply; a second step-up circuit configured to step up voltage of the DC power given from the second power supply; and an inverter circuit connected to both step-up circuits connected in parallel to each other, the inverter circuit configured to convert powers given from both step-up circuits to AC power, wherein a minimum voltage value of the power outputted from the second step-up circuit substantially coincides with a DC input voltage value which is a voltage value of the DC power given from the first power supply.

Advantageous Effects of Invention

The inverter device of the present invention can suppress reduction in power supply efficiency.

DESCRIPTION OF EMBODIMENTS

Summary of Embodiments

Figure 1:
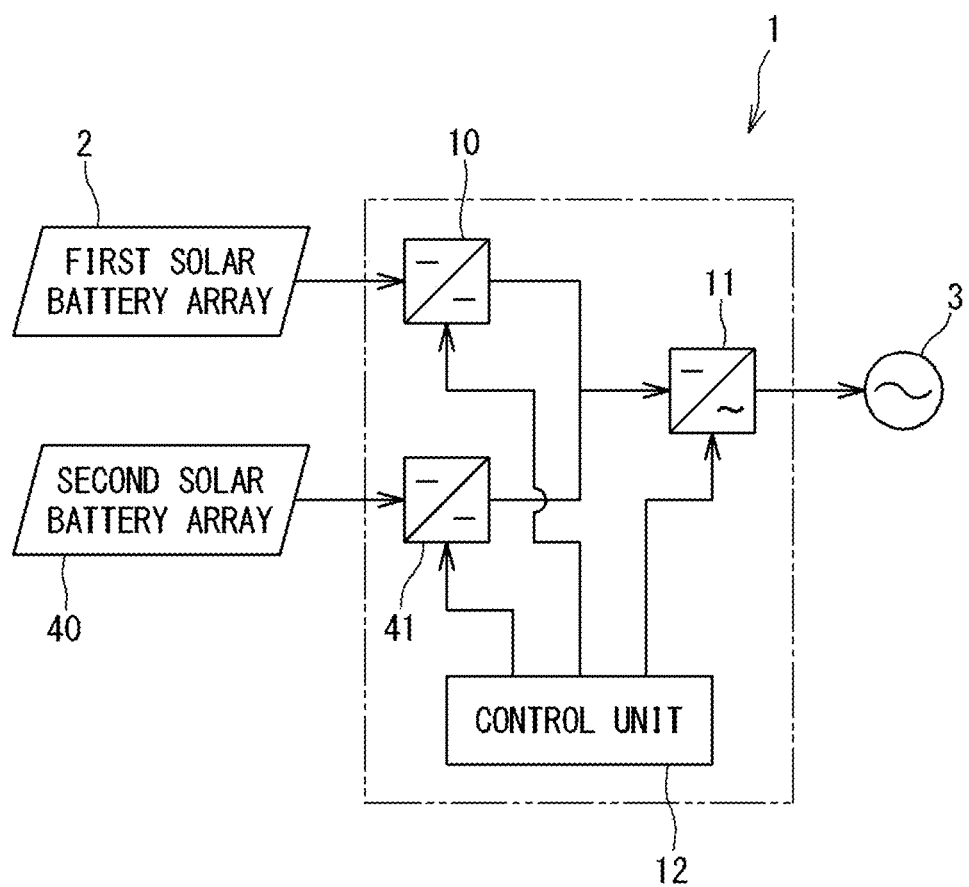
FIG. 1 is a block diagram showing an example of a system including an inverter device according to one embodiment.

Summary of the embodiments of the present invention includes at least the following.

(1) An inverter device includes a circuit configuration for converting, to AC power, DC powers respectively given from a first power supply and a second power supply which outputs power with voltage lower than that of the first power supply. The inverter device includes: a first step-up circuit configured to step up voltage of the DC power given from the first power supply; a second step-up circuit configured to step up voltage of the DC power given from the second power supply; an inverter circuit connected to both step-up circuits connected in parallel to each other, the inverter circuit configured to convert powers given from both step-up circuits to AC power; and a control unit configured to multiply a power value including the AC power outputted from the inverter circuit, by a ratio of a power value of the DC power of each step-up circuit to a total power value obtained by summing the DC powers of both step-up circuits, and set a current target value for each step-up circuit based on a value obtained by the multiplication.

The inverter device configured as described above can make the minimum voltage value of power outputted from the second step-up circuit substantially coincide with the DC input voltage value which is the voltage value of DC power given from the first power supply. Therefore, the voltage value of power outputted from the second step-up circuit can be prevented from becoming greatly smaller than the voltage value of power outputted from the first step-up circuit. As a result, occurrence of a period in which supply of power from the second power supply through the second step-up circuit is not obtained can be prevented, whereby reduction in power supply efficiency can be suppressed.

The inverter device of the above (1) may have specific aspects described in the following (2) to (8), for example.

(2) In the inverter device of the above (1), a smoothing capacitor may be provided between each of the first step-up circuit and the second step-up circuit, and the inverter circuit, and the power value including the AC power outputted from the inverter circuit may also include reactive power passing through the smoothing capacitor.

In this case, it is possible to determine the current target value for each step-up circuit in consideration of reactive power as well.

(3) In the inverter device of the above (1), a smoothing capacitor may be provided between each of the first step-up circuit and the second step-up circuit, and the inverter circuit, and the power value including the AC power outputted from the inverter circuit may also include reactive power passing through the smoothing capacitor and power loss in the inverter device.

In this case, it is possible to determine the current target value for each step-up circuit in consideration of reactive power and power loss as well.

(4) In the inverter device of the above (1), in the case where a number corresponding to the "first" or the "second" is i (=1, 2), the current target value for each step-up circuit is Iin.i*, a current target value for the inverter circuit is Iinv*, a voltage target value for the inverter circuit is Vinv*, a DC input voltage value from each power supply is Vg.i, an input current command value for each DC power is Ig.i*, and a notation "< >" indicates an average value of a value in brackets, the following expression may be satisfied:

$$Iin.i^* = (Iinv^* \times Vinv^*) \times Ig.i^* / \Sigma \langle Ig.i^* \times Vg.i \rangle.$$

(5) In the inverter device of the above (2), in the case where a number corresponding to the "first" or the "second" is i (=1, 2), the current target value for each step-up circuit is Iin.i*, a current target value for the inverter circuit is Iinv*, a voltage target value for the inverter circuit is Vinv*, an electrostatic capacitance of the smoothing capacitor is Co, a voltage target value commonly used for both step-up circuits is Vo*, a DC input voltage value from each power supply is Vg.i, an input current command value for each DC power is Ig.i*, and a notation "< >" indicates an average value of a value in brackets, the following expression may be satisfied:

$$Iin.i^* = ((Iinv^* \times Vinv^*) + (Co \times dVo^*/dt) \times Vo^*) \times Ig.i^* / \Sigma \langle Ig.i^* \times Vg.i \rangle.$$

(6) In the inverter device of the above (2), in the case where a number corresponding to the "first" or the "second" is i (=1, 2), the current target value for each step-up circuit is Iin.i*, a current target value for the inverter circuit is Iinv*, a voltage target value for the inverter circuit is Vinv*, a voltage target value commonly used for both step-up circuits is Vo*, a DC input voltage value from each power supply is Vg.i, an input current command value for each DC power is Ig.i*, current flowing through the smoothing capacitor is Ico, and a notation "< >" indicates an average value of a value in brackets, the following expression may be satisfied:

$$Iin.i^* = ((Iinv^* \times Vinv^*) + Ico \times Vo^*) \times Ig.i^* / \Sigma \langle Ig.i^* \times Vg.i \rangle.$$

(7) In the inverter device of the above (3), in the case where a number corresponding to the "first" or the "second" is i (=1, 2), the current target value for each step-up circuit is Iin.i*, a current target value for the inverter circuit is Iinv*, a voltage target value for the inverter circuit is Vinv*, an electrostatic capacitance of the smoothing capacitor is Co, a voltage target value commonly used for both step-up circuits is Vo*, a DC input voltage value from each power supply is Vg.i, an input current command value for each DC power is Ig.i*, power loss of the inverter device is $P_{LOSS}$, and a notation "< >" indicates an average value of a value in brackets, the following expression may be satisfied:

$$Iin.i^* = ((Iinv^* \times Vinv^*) + (Co \times dVo^*/dt) \times Vo^* + P_{LOSS}) \times Ig.i^* / \Sigma \langle Ig.i^* \times Vg.i \rangle.$$

(8) In the inverter device of the above (3), in the case where a number corresponding to the "first" or the "second" is i (=1, 2), the current target value for each step-up circuit is Iin.i*, a current target value for the inverter circuit is Iinv*, a voltage target value for the inverter circuit is Vinv*, a voltage target value commonly used for both step-up circuits is Vo*, a DC input voltage value from each power supply is Vg.i, an input current command value for each DC power is Ig.i*, current flowing through the smoothing capacitor is Ico, power loss of the inverter device is $P_{LOSS}$, and a notation "< >" indicates an average value of a value in brackets, the following expression may be satisfied:

$$Iin.i^* = ((Iinv^* \times Vinv^*) + Ico \times Vo^* + P_{LOSS}) \times Ig.i^* / \Sigma \langle Ig.i^* \times Vg.i \rangle.$$

(9) In the inverter device of any one of the above (1) to (8), preferably, the inverter circuit outputs the converted AC power to an AC system via a reactor connected to an output end of the inverter circuit, and the control unit controls the inverter circuit to output the AC power having a voltage phase leading a voltage phase of the AC system by several degrees.

In this case, since the voltage phase of converted AC power leads the voltage phase of the AC system by several degrees, the phase of voltage between both ends of the reactor can be caused to lead the voltage phase of the AC system by 90 degrees. Since the current phase of the reactor lags the voltage phase thereof by 90 degrees, the current phase of AC power outputted through the reactor is synchronized with the current phase of the AC system.

As a result, AC power having current in phase with voltage of the AC system can be outputted, whereby reduction in a power factor of the AC power can be suppressed.

(10) In the inverter device of any one of the above (1) to (9), preferably, the control unit controls each step-up circuit and the inverter circuit so that a current phase of AC power outputted from the inverter device becomes the same as the voltage phase of the AC system, and sets a voltage target value for the inverter circuit based on a current target value for controlling the inverter circuit so that the current phase of the AC power outputted from the inverter device becomes the same as the voltage phase of the AC system.

In this case, a voltage target value having an AC waveform with its phase leading a voltage phase of the AC system by several degrees can be obtained appropriately, whereby reduction in a power factor of outputted AC power can be suppressed.

(11) In the inverter device of any one of the above (1) to (10), preferably, the control unit controls the first step-up circuit to stop step-up operation thereof when a voltage target value for the inverter circuit is equal to or smaller than the DC input voltage value or becomes a voltage value slightly smaller than the input voltage value, and the control unit controls the inverter circuit to stop conversion operation thereof when the voltage target value is equal to or greater than the DC input voltage value.

In this case, the control unit performs control so that the first step-up circuit is operated in the case of outputting voltage corresponding to the part where voltage of AC power to be outputted from the inverter circuit is higher than the DC input voltage value, and the inverter circuit is operated in the case of outputting voltage corresponding to the part where the voltage of the AC power is lower than the DC input voltage value. Therefore, a potential difference in power stepped down by the inverter circuit can be reduced, and loss due to switching of the step-up circuit is reduced, whereby AC power can be outputted with increased efficiency. Further, since both the first step-up circuit and the inverter circuit operate based on the voltage target value set by the control unit, occurrence of deviation or distortion between output of the first step-up circuit and output of the inverter circuit which are alternately switched, can be suppressed.

Here, the voltage value slightly lower than the DC input voltage detection value means a voltage value set so as to allow for smooth connection between a current waveform outputted from the first step-up circuit and a current waveform outputted from the inverter circuit, that is, a voltage value set so that output of the first step-up circuit and output of the inverter circuit are superimposed on each other to a degree required for smooth connection between both current waveforms.

(12, 13) In the inverter device of any one of the above (1) to (11), the control unit may use, as the DC input voltage value, an average value calculated from a result of plural measurements of a voltage value of the DC power given from the first power supply.

The control unit may further have a function of: calculating average values of a current value of the first power supply, a voltage value of the second power supply, and a current value of the second power supply from results of plural measurements of the DC powers given from the first power supply and the second power supply; and performing maximum power point tracking control for the first power supply and the second power supply based on the DC input voltage value and each average value.

In this case, even if DC power from each power supply varies to be unstable, the control unit can accurately obtain voltage and current of the DC power as average values. As a result, both power supplies can be appropriately controlled, and reduction in power supply efficiency can be more effectively suppressed.

(14) In inverter device of the above (13), in the case where voltages or currents of DC powers given from both power supplies vary due to variation in output current of the inverter device, the variation cycle coincides with a half cycle of the AC system.

Therefore, preferably, in the case where the inverter circuit outputs the converted AC power to an AC system, the DC input voltage value and the average values are obtained from results of plural measurements of a voltage value and a current value of each DC power performed, during a period that is an integer multiple of a half cycle of the AC system, at time intervals shorter than the half cycle of the AC system. In this case, even if voltage and current of the DC powers from both power supplies vary periodically, the DC input voltage value and the average values can be accurately calculated while the number of times of measurements is decreased.

(15) In the inverter device of the above (13), variations in voltages or currents of DC powers given from both power supplies are due to variation in output current of the inverter device. Therefore, the DC input voltage value and the average values may be obtained from results of plural measurements of a voltage value and a current value of each DC power performed, during a period that is an integer multiple of a half cycle of the AC power converted by the inverter circuit, at time intervals shorter than the half cycle of the AC power. Also in this case, the DC input voltage value and the average values can be accurately calculated while the number of times of measurements is decreased.

(16) In the inverter device of any one of the above (1) to (15), a plurality of the second power supplies, and a plurality of the second step-up circuits to which the second power supplies are connected, may be provided. Also in this case, occurrence of a period in which supply of powers from the plurality of second power supplies is not obtained can be prevented, whereby reduction in power supply efficiency can be suppressed.

(17) Further, the present invention is an inverter device including a circuit configuration for converting, to AC power, DC powers respectively given from a first power supply and a second power supply which outputs power with voltage lower than that of the first power supply, the inverter device including: a first step-up circuit configured to step up voltage of the DC power given from the first power supply; a second step-up circuit configured to step up voltage of the DC power given from the second power supply; and an inverter circuit connected to both step-up circuits connected in parallel to each other, the inverter circuit configured to convert powers given from both step-up circuits to AC power, wherein a minimum voltage value of the power outputted from the second step-up circuit coincides with a DC input voltage value which is a voltage value of the DC power given from the first power supply, within a voltage-drop range of the first step-up circuit.

The inverter device configured as described in the above (17) controls the second step-up circuit so that the minimum voltage value of power outputted from the second step-up circuit substantially coincides with the DC input voltage value given from the first power supply. Therefore, the voltage value of power outputted from the second step-up circuit can be prevented from becoming greatly smaller than the voltage value of power outputted from the first step-up circuit. As a result, occurrence of a period in which supply of power from the second power supply through the second step-up circuit is not obtained can be prevented, whereby reduction in power supply efficiency can be suppressed.

(18) In the inverter device of the above (17), more specifically, it is preferable that the control unit controls the second step-up circuit so that, in a range in which a voltage target value for the first step-up circuit is equal to or smaller than the DC input voltage value of the first step-up circuit, a voltage value of the power outputted from the second step-up circuit coincides with the DC input voltage value of the first step-up circuit, within the voltage-drop range of the first step-up circuit. By such control, the minimum voltage value of power outputted from the second step-up circuit can be made to substantially coincide with the input voltage value.

(19) In the inverter device of the above (1) to (18), DC power may also be outputted from the AC system to each power supply. That is, if the phase of the current target value (Iinv*) and the phase of the voltage target value (Vinv*) for the inverter circuit are shifted from each other by 180 degrees, it is also possible to perform output in a reverse direction from the AC system to each power supply, through the same control of the current target value (Iin*).

Details of Embodiments

Hereinafter, embodiments of the present invention will be described with reference to the drawings.

[1 Overall Configuration]

FIG. 1 is a block diagram showing an example of a system including an inverter device according to one embodiment. In FIG. 1, a first solar battery array 2 and a second solar battery array 40 as DC power supplies are connected to an input end of an inverter device 1, and an AC commercial power system 3 is connected to an output end of the inverter device 1.

This system performs interconnection operation to convert DC power generated by the first solar battery array 2 (hereinafter, may be simply referred to as a first array 2) and the second solar battery array 40 (hereinafter, may be simply referred to as a second array 40), to AC power, and output the AC power to the commercial power system 3.

The first array 2 and the second array 40 are each composed of a plurality of photovoltaic panels (modules) connected in series and parallel. In the present embodiment, the second array 40 is configured such that voltage of power outputted from the second array 40 is smaller than voltage of power outputted from the first array 2.

The inverter device 1 includes a first step-up circuit 10 which receives DC power outputted from the first array 2, a second step-up circuit 41 which receives DC power outputted from the second array 40, an inverter circuit 11 which converts powers given from both step-up circuits 10 and 41 to AC power and outputs the AC power to the commercial power system 3, and a control unit 12 which controls operations of these circuits 10, 11, and 41.

The first step-up circuit 10 and the second step-up circuit 41 are connected in parallel to the inverter circuit 11.

Figure 2:
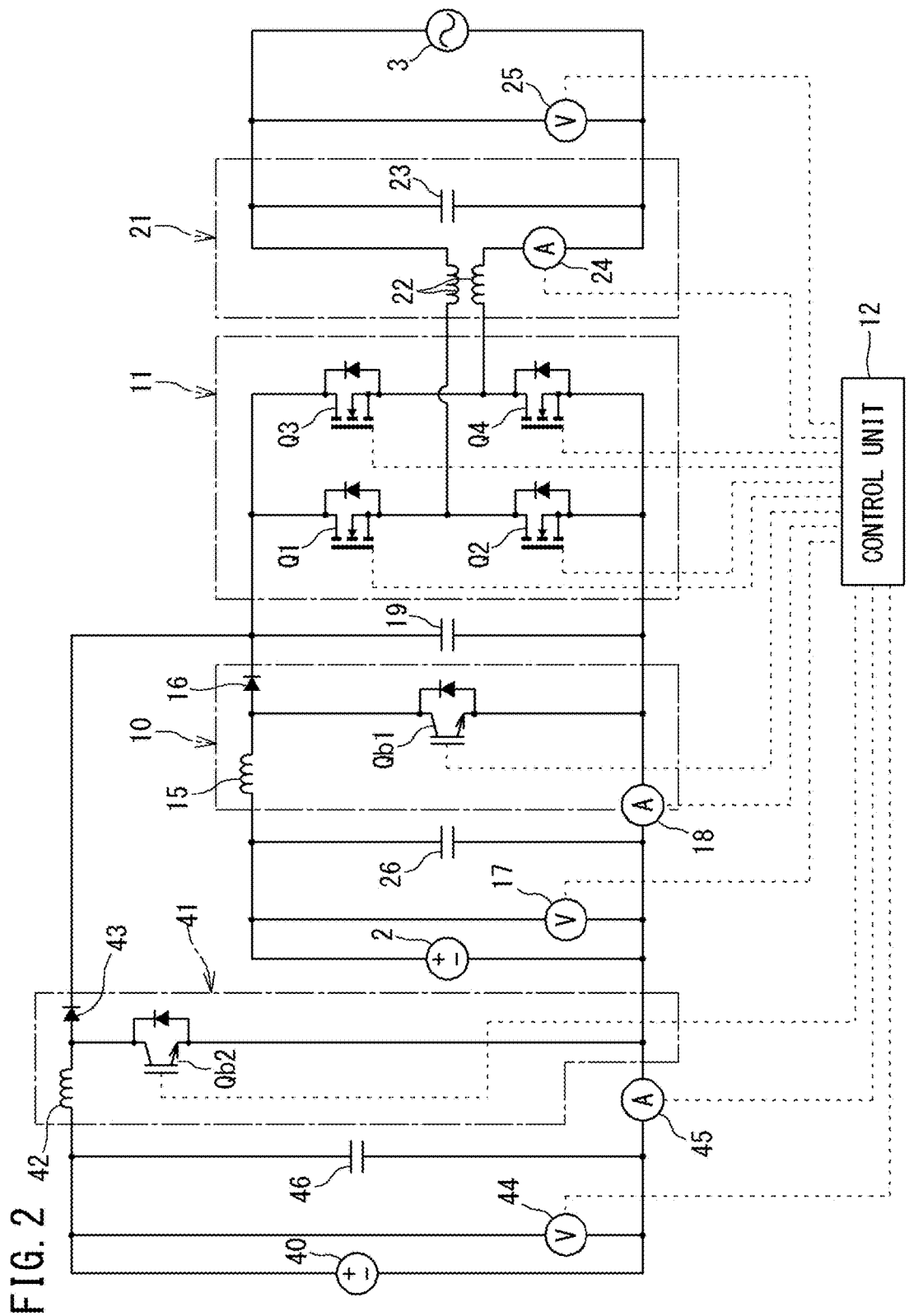
FIG. 2 shows an example of a circuit diagram of the inverter device.

FIG. 2 shows an example of a circuit diagram of the inverter device 1.

The first step-up circuit 10 to which the first array 2 is connected includes a DC reactor 15, a diode 16, and a switching element Qb1 composed of an Insulated Gate Bipolar Transistor (IGBT) or the like, to form a step-up chopper circuit.

On an input side of the first step-up circuit 10, a first voltage sensor 17, a first current sensor 18, and a capacitor 26 for smoothing are provided. The first voltage sensor 17 detects a first DC input voltage detection value Vg.1 (DC input voltage value) of DC power outputted from the first array 2 and then inputted to the first step-up circuit 10, and outputs the first DC input voltage detection value Vg.1 to the control unit 12. The first current sensor 18 detects a first step-up circuit current detection value Iin.1 of current flowing in the DC reactor 15, and outputs the first step-up circuit current detection value Iin.1 to the control unit 12.

The second step-up circuit 41 to which the second array 40 is connected includes a DC reactor 42, a diode 43, and a switching element Qb2 composed of an IGBT or the like, to form a step-up chopper circuit as in the first step-up circuit.

On an input side of the second step-up circuit 41, a second voltage sensor 44, a second current sensor 45, and a capacitor 46 for smoothing are provided. The second voltage sensor 44 detects a second DC input voltage detection value Vg.2 of DC power outputted from the second array 40 and then inputted to the second step-up circuit 41, and outputs the second DC input voltage detection value Vg2 to the control unit 12. The second current sensor 45 detects a second step-up circuit current detection value Iin.2 of current flowing in the DC reactor 42, and outputs the second step-up circuit current detection value Iin.2 to the control unit 12.

The control unit 12 has a function of calculating input powers Pin.1 and Pin.2 from the DC input voltage detection values Vg.1 and Vg.2 and the step-up circuit current detection values Iin.1 and Iin.2 and performing maximum power point tracking (MPPT) control for the first array 2 and the second array 40.

The switching element Qb1 of the first step-up circuit 10 is controlled by the control unit 12 so that a period in which switching operation is performed is alternately switched between the first step-up circuit 10 and the inverter circuit 11 as described later. Therefore, during a period in which switching operation is performed in the first step-up circuit 10, the first step-up circuit 10 outputs stepped-up power to the inverter circuit 11, and during a period in which the switching operation is stopped, the first step-up circuit 10 outputs, to the inverter circuit 11, DC power outputted from the first array 2 and then inputted to the first step-up circuit 10, without stepping up the DC power.

Further, as described later, the second step-up circuit 41 is controlled by the control unit 12 so as to, during a predetermined period, step up a voltage value of DC power given from the second array 40, to a value that substantially coincides with the first DC input voltage detection value Vg.1 which is a voltage value of DC power given from the first array 2, and output the stepped-up power.

A capacitor 19 for smoothing is connected between the step-up circuits 10 and 41 and the inverter circuit 11.

The inverter circuit 11 includes switching elements Q1 to Q4 each composed of a Field Effect Transistor (FET). The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the inverter circuit 11 converts power given from each of the step-up circuits 10 and 41 to AC power.

The inverter device 1 includes a filter circuit 21 between the inverter circuit 11 and the commercial power system 3.

The filter circuit 21 is composed of two AC reactors 22 and a capacitor 23. The filter circuit 21 has a function to remove a high-frequency component contained in AC power outputted from the inverter circuit 11. The AC power from which the high-frequency component has been removed by the filter circuit 21 is given to the commercial power system 3.

A third current sensor 24 for detecting an inverter current detection value Iinv (current flowing in the AC reactor 22) which is a current value of output of the inverter circuit 11 is connected to the filter circuit 21. A third voltage sensor 25 for detecting a voltage value (system voltage detection value Va) on the commercial power system 3 side is connected between the filter circuit 21 and the commercial power system 3.

The third current sensor 24 and the third voltage sensor 25 respectively output the detected inverter current detection value Iinv and the detected system voltage detection value Va to the control unit 12.

The control unit 12 controls the step-up circuits 10 and 41 and the inverter circuit 11 based on the system voltage detection value Va, the inverter current detection value Iinv, the DC input voltage detection values Vg.1 and Vg.2, and the step-up circuit current detection values Iin.1 and Iin.2.

[2 Control Unit]

Figure 3:
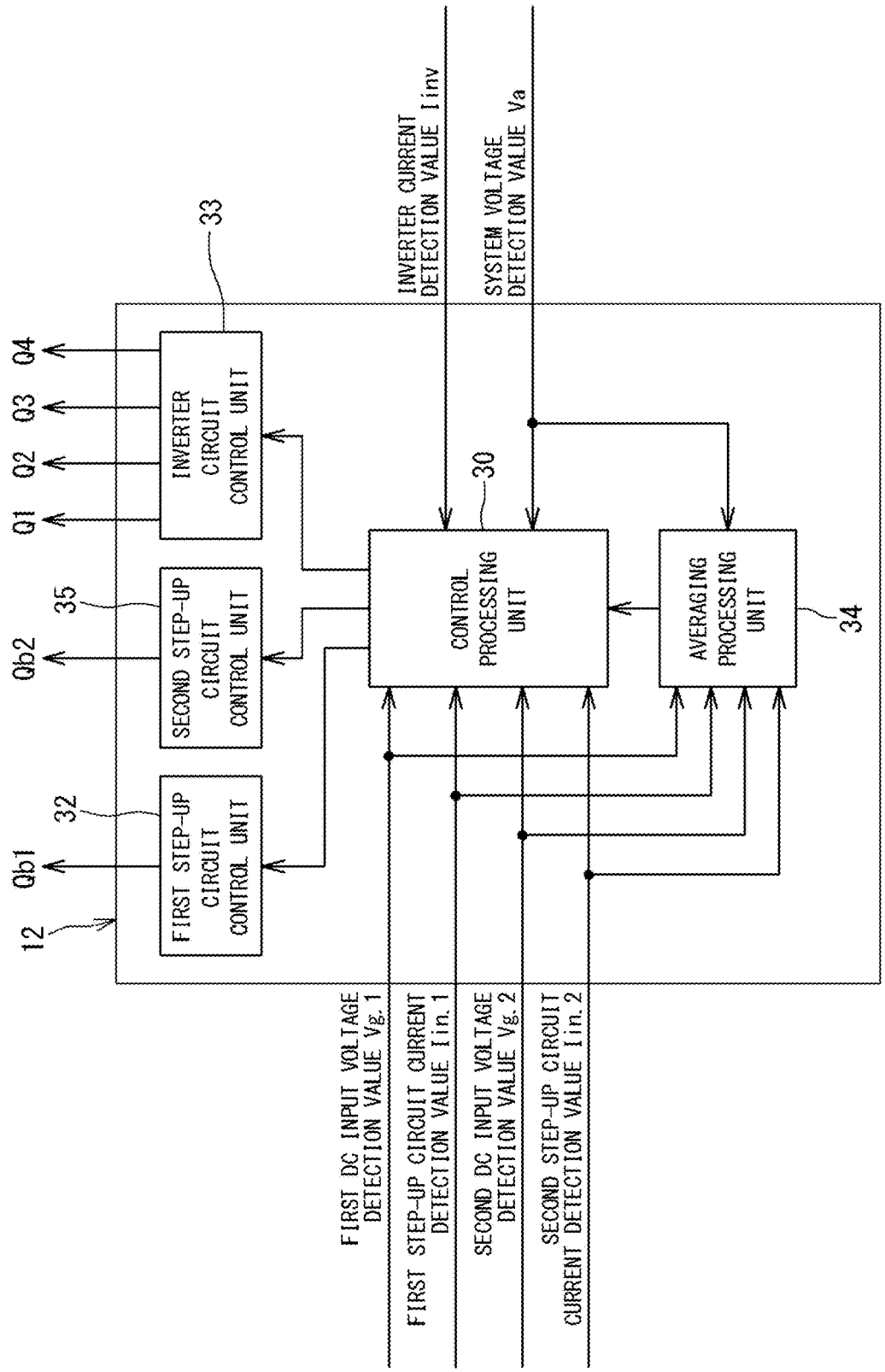
FIG. 3 is a block diagram of a control unit 12.

FIG. 3 is a block diagram of the control unit 12. As shown in FIG. 3, the control unit 12 functionally has a control processing unit 30, a first step-up circuit control unit 32, an inverter circuit control unit 33, an averaging processing unit 34, and a second step-up circuit control unit 35.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The first step-up circuit control unit 32 controls the switching element Qb1 of the first step-up circuit 10 based on a command value and a detection value given from the control processing unit 30, thereby causing the first step-up circuit 10 to output power having current corresponding to the command value.

The second step-up circuit control unit 35 controls the switching element Qb2 of the second step-up circuit 41 based on a command value and a detection value given from the control processing unit 30, thereby causing the second step-up circuit 41 to output power having current corresponding to the command value.

The inverter circuit control unit 33 controls the switching elements Q1 to Q4 of the inverter circuit 11 based on a command value and a detection value given from the control processing unit 30, thereby causing the inverter circuit 11 to output power having current corresponding to the command value.

The control processing unit 30 receives the DC input voltage detection values Vg.1 and Vg.2, the step-up circuit current detection values Iin.1 and Iin.2, the system voltage detection value Va, and the inverter current detection value Iinv.

The control processing unit 30 calculates the first input power Pin.1 of the first step-up circuit 10 and an average value <Pin.1> thereof, and the second input power Pin.2 of the second step-up circuit 41 and an average value <Pin.2> thereof, from the DC input voltage detection values Vg.1 and Vg.2 and the step-up circuit current detection values Iin.1 and Iin.2.

The control processing unit 30 has a function to set a first DC input current command value Ig.1* (which will be described later) of the first step-up circuit 10 based on the first input power average value <Pin.1>, and to perform MPPT control for the first array 2 and perform feedback control for the first step-up circuit 10 and the inverter circuit 11.

The control processing unit 30 also has a function to set a DC input current command value Ig.2* (which will be described later) of the second step-up circuit 41 based on the second input power average value <Pin.2>, and to perform MPPT control for the second array 40 and perform feedback control for the second step-up circuit 41.

The DC input voltage detection values Vg.1 and Vg.2 and the step-up circuit current detection values Iin.1 and Iin.2 are given to the averaging processing unit 34 and the control processing unit 30.

The averaging processing unit 34 has a function to sample, at predetermined time intervals, the DC input voltage detection values Vg.1 and Vg.2 and the step-up circuit current detection values Iin.1 and Iin.2 given from both voltage sensors 17 and 44 and both current sensors 18 and 45, calculate their respective average values, and give the averaged DC input voltage detection values Vg.1 and Vg.2 and the averaged step-up circuit current detection values Iin.1 and Iin.2 to the control processing unit 30.

Figure 4:
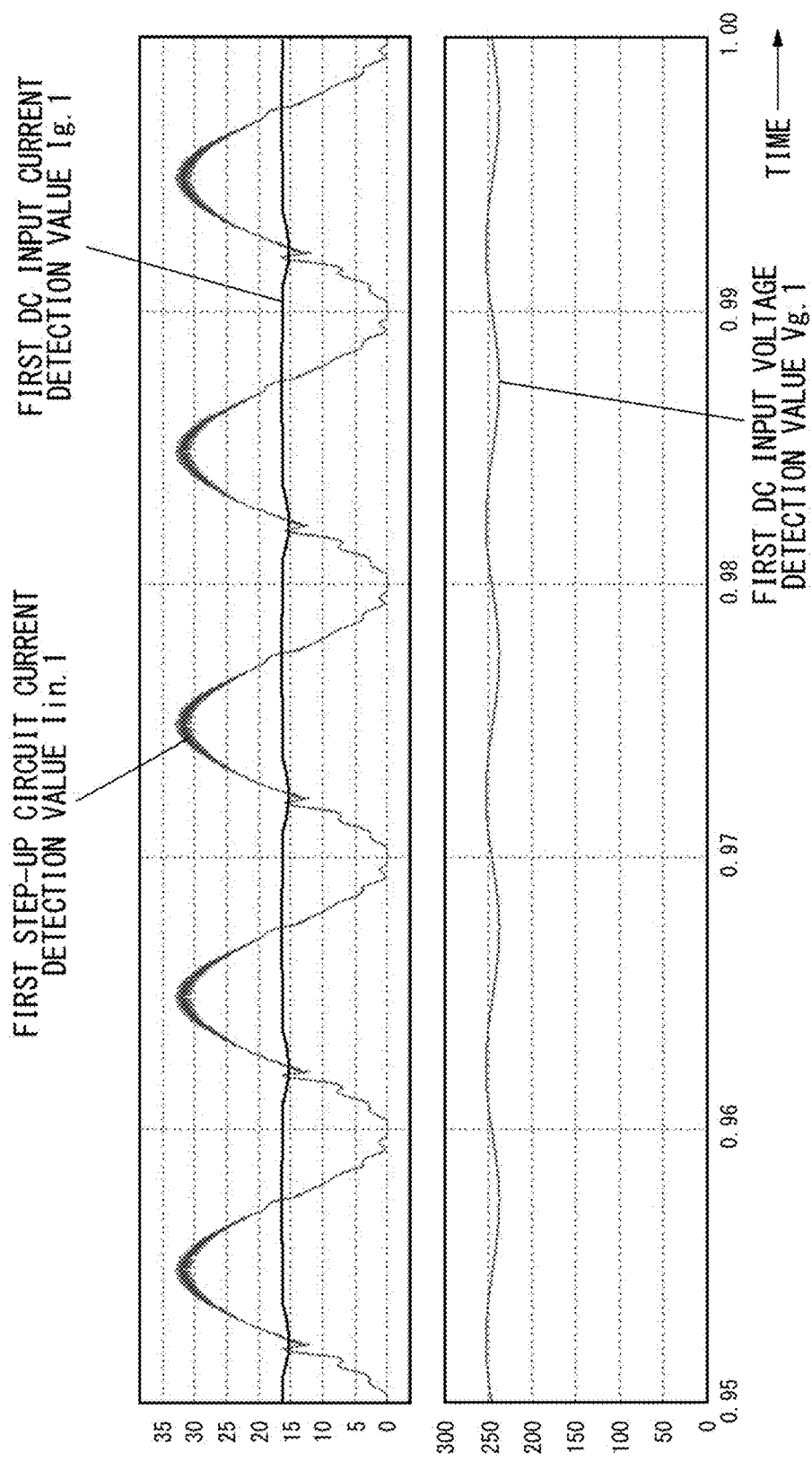
FIG. 4 is a graph showing an example of a simulation result of temporal variations in a first DC input voltage detection value Vg.1 (the vertical axis indicates [V]), a first step-up circuit current detection value Iin.1 (the vertical axis indicates [A]), and a first DC input current detection value Ig.1 (the vertical axis indicates [A]).

FIG. 4 is a graph showing an example of a simulation result of temporal variations in the first DC input voltage detection value Vg.1 and the first step-up circuit current detection value Iin.1.

The first step-up circuit current detection value Iin.1 appears as a waveform synchronized with the system voltage, based on a command value, as described later.

The first DC input current detection value Ig.1 is a current value detected on an input side relative to the capacitor 26.

As shown in FIG. 4, it is found that the first DC input voltage detection value Vg.1 and the first DC input current detection value Ig.1 (first step-up circuit current detection value Iin.1) vary in a half cycle of the system voltage.

The reason why the first DC input voltage detection value Vg.1 and the first DC input current detection value Ig.1 vary periodically as shown in FIG. 4 is as follows. That is, the first step-up circuit current detection value Iin.1 of the inverter device 1 greatly varies between almost 0 A and a peak value in a half cycle of the AC cycle in accordance with operations of the step-up circuit 10 and the inverter circuit 11. Therefore, the variation component cannot be fully removed by the capacitor 26, and the first DC input current detection value Ig.1 is detected as pulsating current containing a component that varies in a half cycle of the AC cycle. On the other hand, output voltage of the photovoltaic panel varies depending on output current.

Therefore, the cycle of the periodic variation occurring in the first DC input voltage detection value Vg.1 is half the cycle of AC power outputted from the inverter device 1. That is, the cycle of the periodic variation is half the cycle of the commercial power system 3.

The averaging processing unit 34 averages the first DC input voltage detection value Vg.1 and the first step-up circuit current detection value Iin.1 in order to suppress an influence of the above periodic variations.

Figure 5:
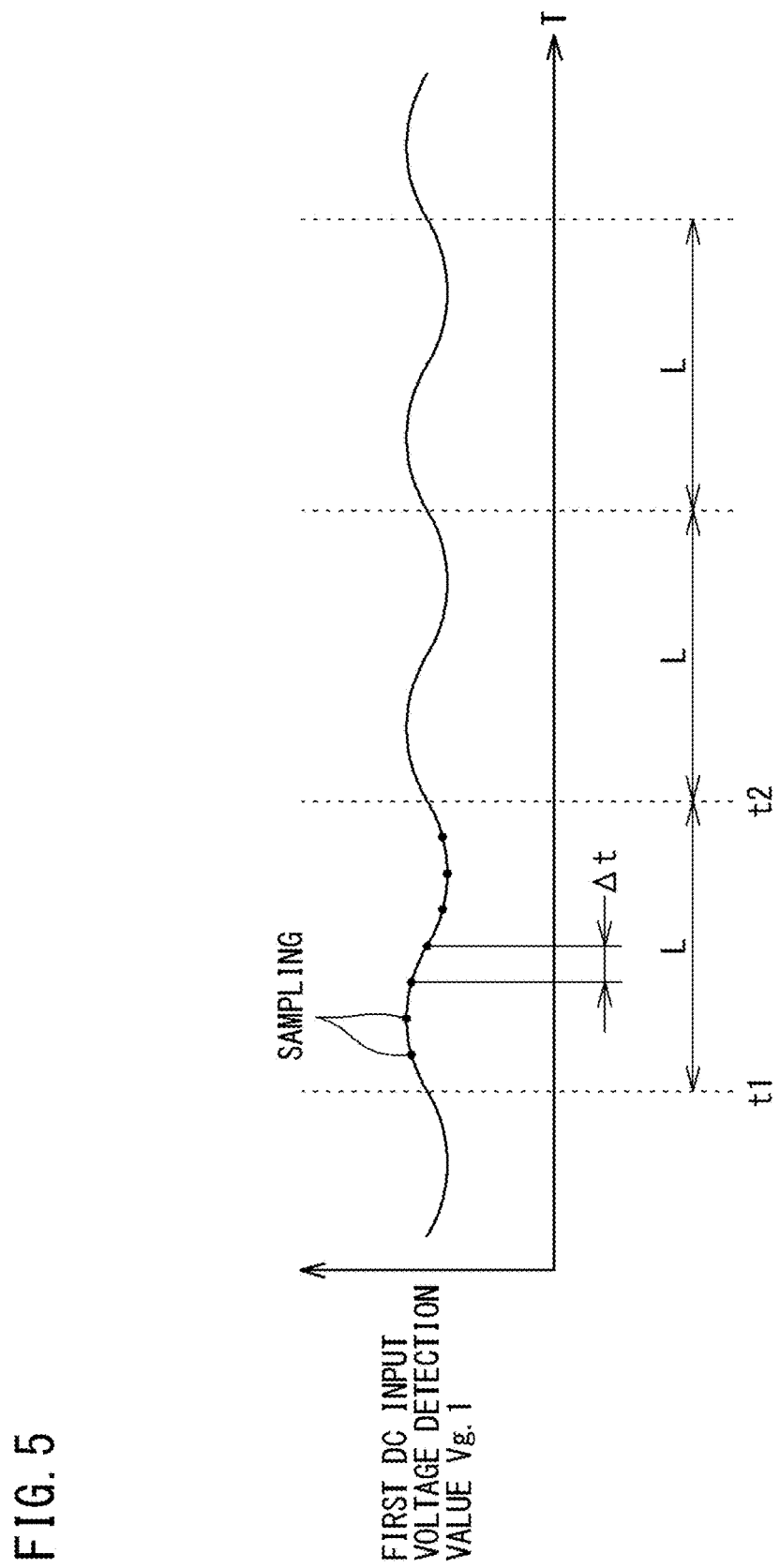
FIG. 5 is a diagram showing a manner in which an averaging processing unit averages the first DC input voltage detection value Vg.1.

FIG. 5 is a diagram showing a manner in which the averaging processing unit 34 averages the first DC input voltage detection value Vg.1.

The averaging processing unit 34 samples the given first DC input voltage detection value Vg.1 a plurality of times (at timings indicated by solid dots in FIG. 5) at predetermined time intervals Δt during a period L from a timing t1 to a timing t2, and calculates an average value of the plurality of first DC input voltage detection values Vg.1 that have been obtained.

Here, the averaging processing unit 34 sets the period L to half the length of the cycle of the commercial power system 3. In addition, the averaging processing unit 34 sets the time interval Δt to be sufficiently shorter than half the length of the cycle of the commercial power system 3.

Thus, the averaging processing unit 34 can accurately obtain the average value of the first DC input voltage detection value Vg.1 which periodically varies in a half cycle of the commercial power system 3, using as short a sampling period as possible.

The time interval Δt of sampling may be set at, for example, 1/100 to 1/1000 of the cycle of the commercial power system 3, or 20 microseconds to 200 microseconds.

The averaging processing unit 34 may store the period L in advance, or may acquire the system voltage detection value Va from the third voltage sensor 25 and acquire information about the cycle of the commercial power system 3.

Here, the period L is set to half the length of the cycle of the commercial power system 3. The average value of the first DC input voltage detection value Vg.1 can be accurately calculated at least if the period L is set to half the cycle of the commercial power system 3. This is because the first DC input voltage detection value Vg.1 periodically varies in a half cycle of the commercial power system 3 in accordance with operations of the step-up circuit 10 and the inverter circuit 11 as described above.

Therefore, if it is required to set the period L to be longer, the period L may be set to an integer multiple of a half cycle of the commercial power system 3, e.g., three or four times of a half cycle of the commercial power system 3. Thus, the voltage variation can be grasped on a cycle basis.

As described above, the first step-up circuit current detection value Iin.1 also periodically varies in a half cycle of the commercial power system 3, as in the first DC input voltage detection value Vg.1.

Therefore, the averaging processing unit 34 also calculates an average value of the first step-up circuit current detection value Iin.1 by the same method as in the first DC input voltage detection value Vg.1 shown in FIG. 5.

Further, the second DC input voltage detection value Vg.2 and the second step-up circuit current detection value Iin.2 on the second array 40 side also periodically vary in a half cycle of the commercial power system 3, for the same reason as for the first DC input voltage detection value Vg.1.

Therefore, the averaging processing unit 34 also calculates average values of the second DC input voltage detection value Vg.2 and the second step-up circuit current detection value Iin.2 by the same method as for the first DC input voltage detection value Vg.1 shown in FIG. 5.

The control processing unit 30 sequentially calculates average values of the DC input voltage detection values Vg.1 and Vg.2 and average values of the step-up circuit current detection values Iin.1 and Iin.2 per the period L.

The averaging processing unit 34 gives the calculated average values of the DC input voltage detection values Vg.1 and Vg.2 and the calculated average values of the step-up circuit current detection values Iin.1 and Iin.2 to the control processing unit 30.

In the present embodiment, as described above, the averaging processing unit 34 calculates average values of the DC input voltage detection values Vg.1 and Vg.2 and average values of the step-up circuit current detection values Iin.1 and Iin.2, and using these values, the control processing unit 30 controls both step-up circuits 10 and 41 and the inverter circuit 11 while performing MPPT control for both arrays 2 and 40. Therefore, even if DC currents from the both arrays 2 and 40 vary to be unstable, the control unit 12 can accurately obtain outputs of both arrays 2 and 40 as the average values of the DC input voltage detection values Vg.1 and Vg.2 and the average values of the step-up circuit current detection values Iin.1 and Iin.2. As a result, it becomes possible to appropriately perform MPPT control and effectively suppress reduction in power supply efficiency.

As described above, in the case where voltages (DC input voltage detection values Vg.1 and Vg.2) or currents (step-up circuit current detection values Iin.1 and Iin.2) of DC powers outputted from both arrays 2 and 40 vary due to variation in input current to the inverter device 1, the cycle of the variation coincides with a half cycle (a half cycle of the commercial power system 3) of AC power outputted from the inverter circuit 11.

In this regard, in the present embodiment, the DC input voltage detection values Vg.1 and Vg.2 and the step-up circuit current detection values Iin.1 and Iin.2 are each sampled a plurality of times at the time intervals Δt which are sufficiently shorter than a half cycle of the AC system, during the period L which is set to half the length of the cycle of the commercial power system 3, and the average values of the DC input voltage detection values Vg.1 and Vg.2 and the average values of the step-up circuit current detection values Iin.1 and Iin.2 are calculated from a result of the sampling. Therefore, even if voltage and current of the DC current vary periodically, the DC input voltage detection values Vg.1 and Vg.2 and the step-up circuit current detection values Iin.1 and Iin.2 can be accurately calculated.

Such variations occurring in the DC input voltage detection values Vg.1 and Vg.2 and the step-up circuit current detection values Iin.1 and Iin.2 given from both arrays 2 and 40 are due to variation in impedance of the inverter circuit 11 or the like as described above. Therefore, the DC input voltage detection values Vg.1 and Vg.2 and the step-up circuit current detection values Iin.1 and Iin.2 may be obtained from a result of sampling performed a plurality of times at time intervals Δt which are shorter than a half cycle of AC power outputted from the inverter circuit 11.

The control processing unit 30 sets the DC input current command values Ig.1* and Ig.2* based on the above input power average values <Pin.1> and <Pin.2>, and calculates command values for both step-up circuits 10 and 41 and the inverter circuit 11 based on the set DC input current command values Ig.1* and Ig.2* and the above values.

The control processing unit 30 has a function of giving the calculated command values to the first step-up circuit control unit 32, the second step-up circuit control unit 35, and the inverter circuit control unit 33 and performing feedback control for both step-up circuits 10 and 41 and the inverter circuit 11.

Figure 6:
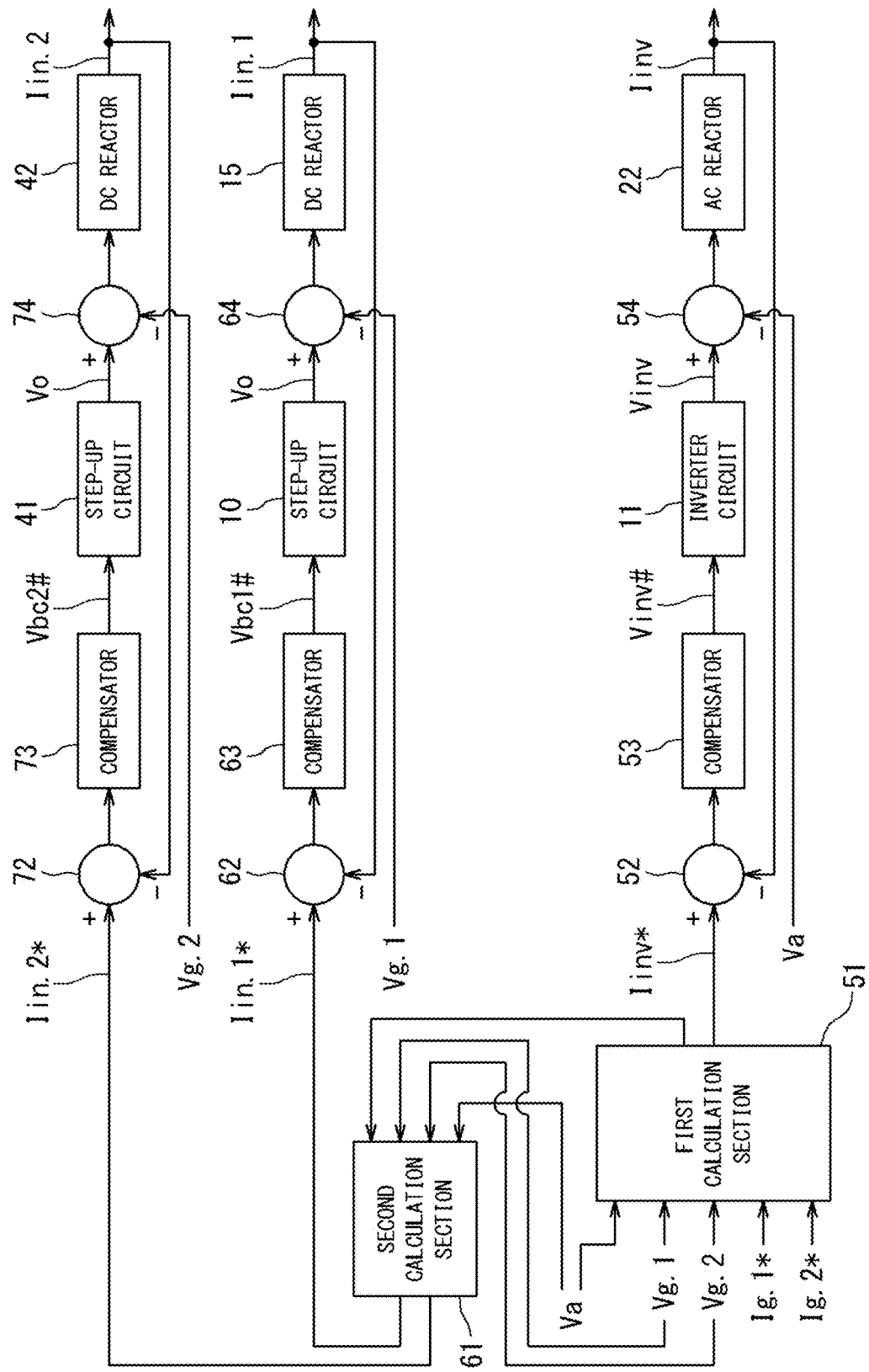
FIG. 6 is a control block diagram for explaining a control process by a control processing unit.

FIG. 6 is a control block diagram for explaining a control process by the control processing unit 30.

The control processing unit 30 includes, as function sections for controlling the inverter circuit 11, a first calculation section 51, a first adder 52, a compensator 53, and a second adder 54.

In addition, the control processing unit 30 includes, as function sections for controlling both step-up circuits 10 and 41, a second calculation section 61, a third adder 62, a compensator 63, a fourth adder 64, a fifth adder 72, a compensator 73, and a sixth adder 74.

Figure 7:
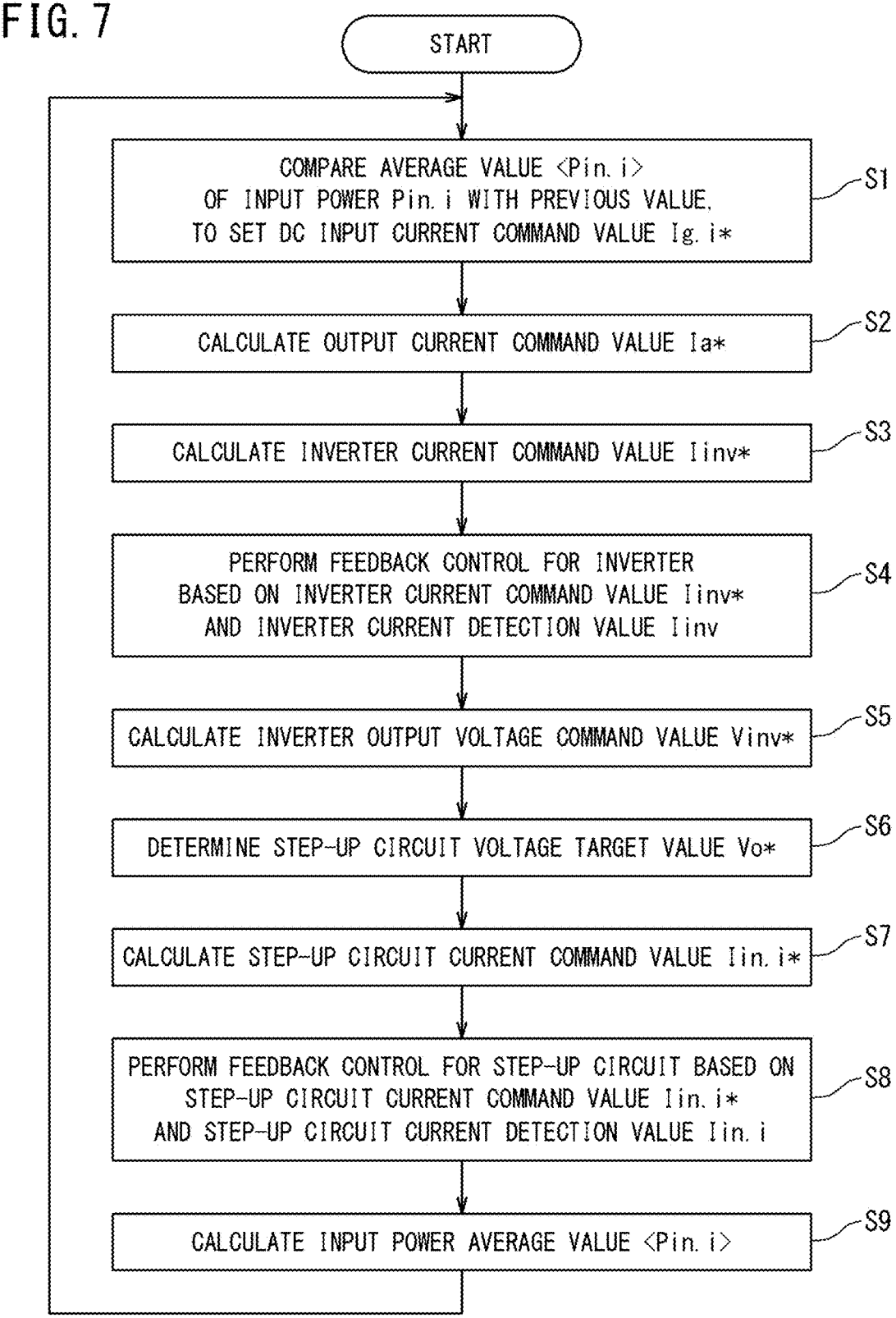
FIG. 7 is a flowchart showing a control process for both step-up circuits and an inverter circuit.

FIG. 7 is a flowchart showing a control process for both step-up circuits 10 and 41 and the inverter circuit 11. The function sections shown in FIG. 6 control both step-up circuits 10 and 41 and the inverter circuit 11 by executing the process shown in the flowchart in FIG. 7.

Hereinafter, the control process for both step-up circuits 10 and 41 and the inverter circuit 11 will be described with reference to FIG. 7.

First, the control processing unit 30 calculates the present input power average value <Pin.i> (step S9), and compares the present input power average value <Pin.i> with the input power average value <Pin.i> that has been previously calculated, to set the DC input current command value Ig.i* (step S1). The input power average value <Pin.i> is calculated based on the following expression (1).

$$\text{Input power average value} <Pin.i> = <Iin.i \times Vg.i> \qquad (1)$$

In expression (1), "i" is a number corresponding to each step-up circuit connected to the inverter circuit 11, and is, in the present embodiment, "1" or "2". The case of "i=1" corresponds to the first step-up circuit 10, and the case of "i=2" corresponds to the second step-up circuit 41. Therefore, <Pin.1> indicates an input power average value of the first step-up circuit 10, and <Pin.2> indicates an input power average value of the second step-up circuit 41.

In the present embodiment, the control processing unit 30 calculates the input power average values <Pin.1> and <Pin.2>, and sets the DC input current command values Ig.1* and Ig.2*.

In expression (1), Iin.i is the step-up circuit current detection value, and Vg.i is the DC input voltage detection value, and the step-up circuit current detection value Iin.i and the DC input voltage detection value Vg.i are values averaged by the averaging processing unit 34.

In each expression other than expression (1) and relevant to the control shown below, instantaneous values which are not averaged are used for the step-up circuit current detection value Iin.i and the DC input voltage detection value Vg.i.

That is, the average value of the step-up circuit current detection value Iin.i and the average value of the DC input voltage detection value Vg.i are used for calculating the input power average value <Pin.i>.

A notation "< >" indicates an average value or an effective value of a value in the brackets. The same applies hereinafter.

The control processing unit 30 gives the set DC input current command value Ig.i* to the first calculation section 51.

As well as the DC input current command value Ig.i*, the DC input voltage detection value Vg.i and the system voltage detection value Va are given to the first calculation section 51.

The first calculation section 51 calculates an effective value <Ia*> of an output current command value for the inverter device 1, based on the following expression (2), using the given DC input current command value Ig.i*, DC input voltage detection value Vg.i, and system voltage detection value Va.

$$\text{Effective value} <Ia^*> \text{ of output current command value} = \Sigma <Ia.i^*> = \Sigma (<Ig.i^* \times Vg.i>/<Va>) \quad (2)$$

Further, the first calculation section 51 calculates an output current command value Ia* based on the following expression (3) (step S2).

Here, the first calculation section 51 calculates the output current command value Ia* as a sine wave having the same phase as the system voltage detection value Va.

$$\text{Output current command value } Ia^* = (\sqrt{2}) \times <Ia^*> \times \sin \omega t \quad (3)$$

Next, the first calculation section 51 calculates an inverter current command value Iinv* which is a current target value for controlling the inverter circuit 11, as shown by the following expression (4) (step S3).

$$\text{Inverter current command value } Iinv^* = Ia^* + sCaVa \quad (4)$$

In expression (4), Ca is an electrostatic capacitance of the capacitor 23, and s is the Laplace operator.

The above expression (4) is represented as follows, using a derivative with respect to time t.

$$Iinv^* = Ia^* + Ca \times (d\, Va/dt) \quad (4a)$$

In expressions (4) and (4a), the second term on the right-hand side is a value added in consideration of current flowing through the capacitor 23 of the filter circuit 21.

The output current command value Ia* is calculated as a sine wave having the same phase as the system voltage detection value Va, as shown by the above expression (3). That is, the control processing unit 30 controls the inverter circuit 11 so that a current phase of AC power outputted from the inverter device 1 is the same as a phase of the system voltage (system voltage detection value Va).

After calculating the inverter current command value Iinv*, the first calculation section 51 gives the inverter current command value Iinv* to the first adder 52.

The inverter circuit 11 is subjected to feedback control based on the inverter current command value Iinv*.

As well as the inverter current command value Iinv*, the present inverter current detection value Iinv is given to the first adder 52.

The first adder 52 calculates a difference between the inverter current command value Iinv* and the present inverter current detection value Iinv, and gives a result of the calculation to the compensator 53.

When the difference is given, the compensator 53 calculates, based on a proportionality coefficient or the like, an inverter voltage reference value Vinv# that allows the difference to converge so that the inverter current detection value Iinv becomes the inverter current command value Iinv*. The compensator 53 gives the inverter voltage reference value Vinv# to the inverter circuit control unit 33, thereby causing the inverter circuit 11 to output power according to the inverter output voltage command value Vinv*.

The power outputted from the inverter circuit 11, from which the system voltage detection value Va is subtracted by the second adder 54, is given to the AC reactor 22, and then fed back as a new inverter current detection value Iinv. Then, a difference between the inverter current command value Iinv* and the inverter current detection value Iinv is calculated again by the first adder 52, and the inverter circuit 11 is controlled based on the difference as described above.

As described above, the inverter circuit 11 is subjected to feedback control based on the inverter current command value Iinv* and the inverter current detection value Iinv (step S4).

On the other hand, the inverter current command value Iinv* calculated by the first calculation section 51, as well as the DC input voltage detection value Vg.i and the system voltage detection value Va, is given to the second calculation section 61.

The second calculation section 61 calculates an inverter output voltage command value Vinv* based on the following expression (5) (step S5).

$$\text{Inverter output voltage command value } Vinv^* = Va + s\, La\, Iinv^* \quad (5)$$

In expression (5), La is an inductance of the AC reactor, and s is the Laplace operator.

The above expression (5) is represented as follows, using a derivative with respect to time t.

$$Vinv^* = Va + La \times (d\, Iinv^*/dt) \quad (5a)$$

In expressions (5) and (5a), the second term on the right-hand side is a value added in consideration of voltage generated between both ends of the AC reactor 22.

In the present embodiment, the inverter output voltage command value Vinv* (voltage target value) is set based on the inverter current command value Iinv* which is the current target value for controlling the inverter circuit 11 so that current of AC power outputted from the inverter device 1 has the same phase as the system voltage detection value Va.

After calculating the inverter output voltage command value Vinv*, the second calculation section 61 compares the DC input voltage detection value Vg with an absolute value of the inverter output voltage command value Vinv* and determines the greater one to be the step-up circuit voltage target value Vo* as shown by the following expression (6) (step S6).

$$\text{Step-up circuit voltage target value } Vo^* = \text{Max}(Vg, \text{absolute value of } Vinv^*) \quad (6)$$

In expression (6), the step-up circuit voltage target value Vo* is a voltage command value for powers outputted from both step-up circuits 10 and 41.

For Vg, as shown by the following expression (7), the greatest one of the DC input voltage detection values Vg of the step-up circuits 10 and 41 is employed.

$$Vg = \text{Max}(Vg.i) \quad (7)$$

Further, the second calculation section 61 calculates a step-up circuit current command value Iin* based on the following expression (8) (step S7).

$$\text{Step-up circuit current command value } Iin.i^* = ((Iinv^* \times Vinv^*) + (s\, CoVo^*) \times Vo^*) \times Ig.i^* / \Sigma <Ig.i^* \times Vg.i> \quad (8)$$

In expression (8), Co is an electrostatic capacitance of the capacitor 19 (smoothing capacitor), and s is the Laplace operator.

The above expression (8) is represented as follows, using a derivative with respect to time t.

$$Iin.i^* = ((Iinv^* \times Vinv^*) + (Co \times dVo^*/dt) \times Vo^*) \times Ig.i^* / \Sigma <Ig.i^* \times Vg.i> \quad (8a)$$

If current flowing through the capacitor 19 is detected and the detected current is denoted by Ico, the following expression is obtained.

$$Iin.i^* = ((Iinv^* \times Vinv^*) + Ico \times Vo^*) \times Ig.i^* / \Sigma <Ig.i^* \times Vg.i> \quad (8b)$$

In expressions (8), (8a), and (8b), a term added to a product of the inverter current command value Iinv* and the inverter output voltage command value Vinv* is a value added in consideration of reactive power passing through the capacitor 19. That is, consideration of the reactive power in addition to the power target value for the inverter circuit 11 allows for more accurate calculation of the value of Iin.i*.

Further, if power loss $P_{LOSS}$ of the inverter device 1 is measured in advance, the above expression (8a) can be represented as follows.

$$Iin.i^* = ((Iinv^* \times Vinv^*) + (Co \times dVo^*/dt) \times Vo^* + P_{LOSS}) \times Ig.i^*/\Sigma < Ig.i^* \times Vg.i > \quad (8c)$$

Similarly, the above expression (8b) can be represented as follows.

$$Iin.i^* = ((Iinv^* \times Vinv^*) + Ico \times Vo^* + P_{LOSS}) \times Ig.i^*/\Sigma < Ig.i^* \times Vg.i > \quad (8d)$$

In this case, consideration of the reactive power and the power loss $P_{LOSS}$ in addition to the power target value of the inverter circuit 11 allows for more strict calculation of the value of Iin.i*.

If the electrostatic capacitance Co and the power loss $P_{LOSS}$ of the capacitor 19 are sufficiently smaller than (Iinv*×Vinv*), the following expression (9) is obtained. Using the expression (9) simplifies calculation processing and shortens calculation time.

$$\text{Step-up circuit current command value } Iin.i^* = (Iinv^* \times Vinv^*) \times Ig.i^*/\Sigma < Ig.i^* \times Vg.i > \quad (9)$$

The coefficient {Ig.i*/Σ<Ig.i*×Vg.i>} on the right-hand side in expression (9) is a proportional division coefficient for calculating Iin.i*, the proportional division coefficient being obtained by dividing, by the DC input voltage detection value Vg.i, {Ig.i*×Vg.i/Σ<Ig.i*×Vg.i>} which is a ratio of a power value (Ig.i*Vg.i) of DC power of each of the step-up circuits 10 and 41 to Σ<Ig.i*×Vg.i> which is a total power value obtained by summing the DC powers of the step-up circuits 10 and 41, as shown by the following expression.

$$\{Ig.i^* \times Vg.i/\Sigma < Ig.i^* \times Vg.i >\}/Vg.i = Ig.i^*/\Sigma < Ig.i^* \times Vg.i > \quad (10)$$

The expression (10) may be the following expression (11).

$$< Iin.i >/\Sigma < Iin.i \times Vg.i > \quad (11)$$

The second calculation section 61 calculates the step-up circuit current command value Iin.i* (step-up circuit current command values Iin.1* and Iin.2*) as described above. The second calculation section 61 gives the step-up circuit current command value Iin.1* to the third adder 62.

The first step-up circuit 10 is subjected to feedback control based on the step-up circuit current command value Iin.1*.

As well as the step-up circuit current command value Iin.1*, the present first step-up circuit current detection value Iin.1 is given to the third adder 62.

The third adder 62 calculates a difference between the step-up circuit current command value Iin.1* and the present first step-up circuit current detection value Iin.1, and gives a result of the calculation to the compensator 63.

When the above difference is given, the compensator 63 calculates, based on a proportionality coefficient or the like, a first step-up circuit voltage reference value Vbc1# that allows the difference to converge so that the first step-up circuit current detection value Iin.1 becomes the step-up circuit current command value Iin.1*. The compensator 63 gives the first step-up circuit voltage reference value Vbc1# to the first step-up circuit control unit 32, thereby causing the first step-up circuit 10 to output power according to the step-up circuit voltage target value Vo*.

The power outputted from the first step-up circuit 10, from which the DC input voltage detection value Vg.1 is subtracted by the fourth adder 64, is given to the DC reactor 15, and then fed back as a new first step-up circuit current detection value Iin.1. Then, a difference between the step-up circuit current command value Iin.1* and the first step-up circuit current detection value Iin.1 is calculated again by the third adder 62, and the first step-up circuit 10 is controlled based on the difference as described above.

As described above, the first step-up circuit 10 is subjected to feedback control based on the step-up circuit current command value Iin.1* and the first step-up circuit current detection value Iin.1 (step S8).

The second calculation section 61 gives the step-up circuit current command value Iin.2* to the fifth adder 72.

The second step-up circuit 41 is subjected to feedback control based on the step-up circuit current command value Iin.2*.

As well as the step-up circuit current command value Iin.2*, the present second step-up circuit current detection value Iin.2 is given to the fifth adder 72.

The fifth adder 72 calculates a difference between the step-up circuit current command value Iin.2* and the present second step-up circuit current detection value Iin.2, and gives a result of the calculation to the compensator 73.

When the above difference is given, the compensator 73 calculates, based on a proportionality coefficient or the like, a second step-up circuit voltage reference value Vbc2# that allows the difference to converge so that the second step-up circuit current detection value Iin.2 becomes the step-up circuit current command value Iin.2*. The compensator 73 gives the second step-up circuit voltage reference value Vbc2# to the second step-up circuit control unit 35, thereby causing the second step-up circuit 41 to output power according to the step-up circuit voltage target value Vo*.

Thus, as in the first step-up circuit 10, the second step-up circuit 41 is subjected to feedback control based on the step-up circuit current command value Iin.2* and the second step-up circuit current detection value Iin.2 (step S8).

After the above step S8, the control processing unit 30 calculates the present input power average value <Pin.i> based on the above expression (1) (step S9).

Based on comparison with the input power average value <Pin.i> that has been previously calculated, the control processing unit 30 sets the DC input current command value Ig.i* so that the input power average value <Pin.i> becomes a maximum value (follows the maximum power point).

Thus, the control processing unit 30 controls both step-up circuits 10 and 41 and the inverter circuit 11 while performing MPPT control for the first array 2 and the second array.

Figure 8:
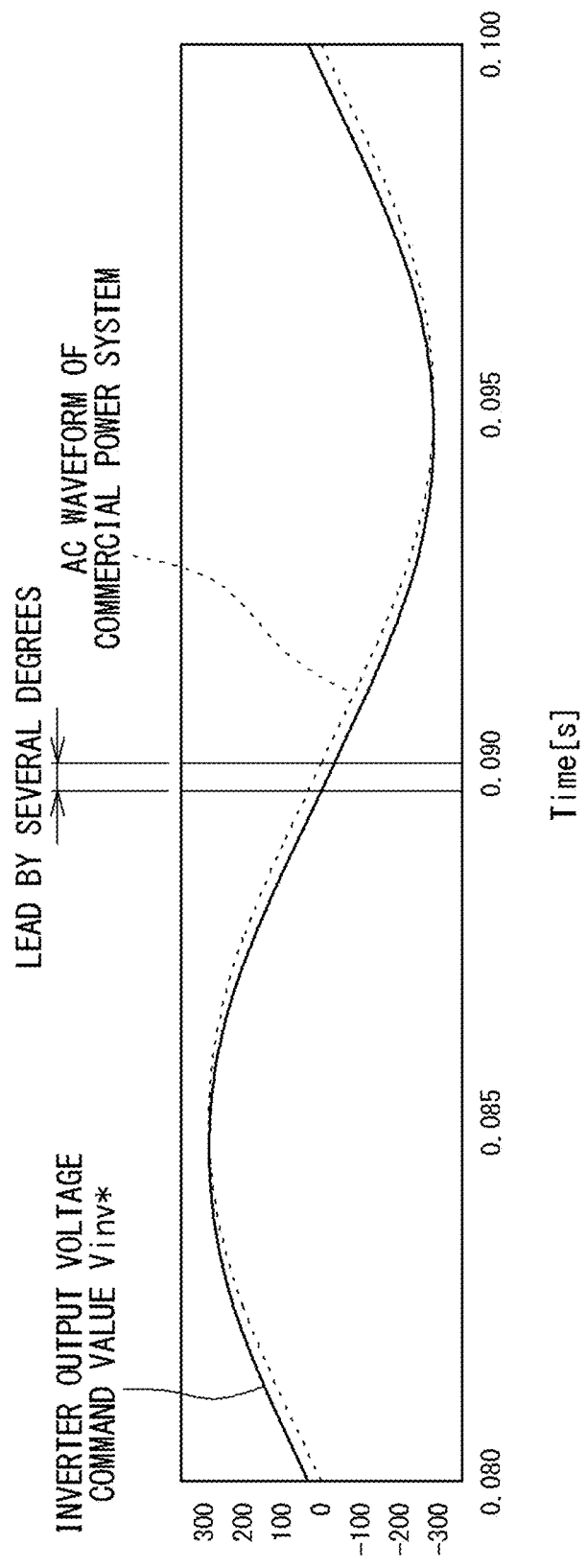
FIG. 8 is a diagram showing an example of an inverter output voltage command value Vinv* (the vertical axis indicates [V]).

FIG. 8 is a diagram showing an example of the inverter output voltage command value Vinv*. In FIG. 8, the vertical axis indicates voltage and the horizontal axis indicates time. A broken line indicates a voltage waveform of the commercial power system 3, and a solid line indicates a waveform of the inverter output voltage command value Vinv*.

The inverter device 1 outputs power, using the inverter output voltage command value Vinv* shown in FIG. 8 as a voltage target value, through the control according to the flowchart in FIG. 7.

Therefore, the inverter device 1 outputs power having voltage according to the waveform of the inverter output voltage command value Vinv* shown in FIG. 8.

As shown in FIG. 8, the two waveforms have almost the same voltage value and the same frequency, but the phase of the inverter output voltage command value Vinv* leads the phase of voltage of the commercial power system 3 by several degrees.

The control processing unit 30 of the present embodiment causes the phase of the inverter output voltage command value Vinv* to lead the phase of voltage of the commercial power system 3 by about three degrees while executing the feedback control for the step-up circuit 10 and the inverter circuit 11, as described above.

The degree of angle by which the phase of the inverter output voltage command value Vinv* is caused to lead the phase of voltage of the commercial power system 3 may be several degrees, and as described later, the degree of angle is set within such a range that the phase of a voltage waveform of a difference from a voltage waveform of the commercial power system 3 leads the phase of the voltage waveform of the commercial power system 3 by 90 degrees. For example, the degree of the phase leading angle is set to be greater than 0 degrees and smaller than 10 degrees.

[3 Voltage Command Value for Step-Up Circuit]

In the present embodiment, as described above, the second array 40 connected to the second step-up circuit 41 is configured to output power having smaller voltage than voltage of power outputted from the first array 2.

On the other hand, as shown by the above expressions (6) and (7) and step S6 in FIG. 7, the step-up circuit voltage target value Vo* which is a voltage command value for powers outputted from both step-up circuits 10 and 41 is set as follows.

That is, the first DC input voltage detection value Vg.1 of the first array 2 and the second DC input voltage detection value Vg.2 of the second array 40 are compared with each other, and the first DC input voltage detection value Vg.1 which is the higher voltage is selected (expression (7)).

Subsequently, the selected first DC input voltage detection value Vg.1 and an absolute value of the inverter output voltage command value Vinv* are compared with each other, and the higher value is employed, thus obtaining the step-up circuit voltage target value Vo*.

Figure 9:
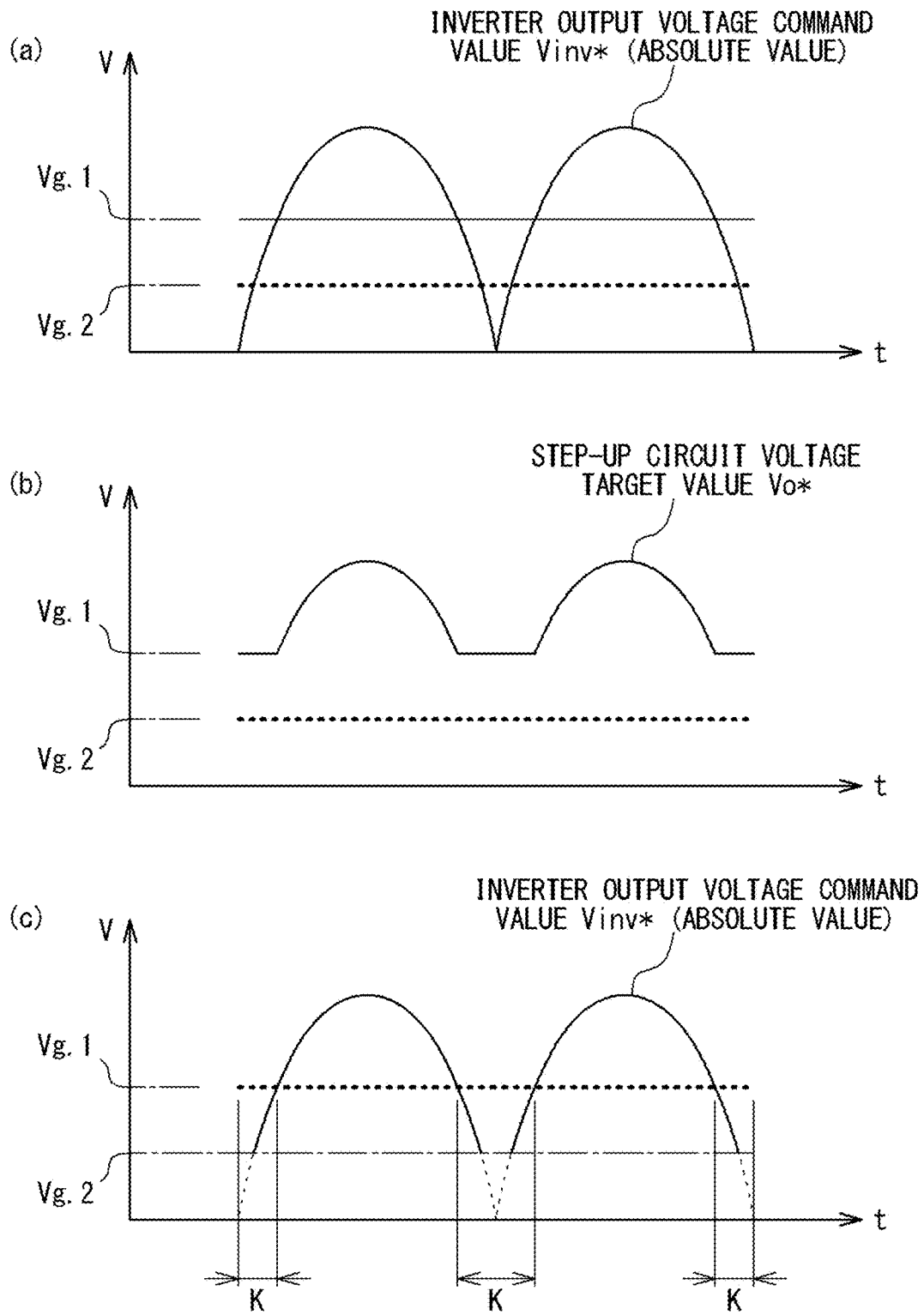
FIG. 9 is a schematic diagram showing how to calculate a step-up circuit voltage target value Vo*, in which (a) shows comparison between the inverter output voltage command value Vinv* and the first DC input voltage detection value Vg.1, (b) shows a waveform of the step-up circuit voltage target value Vo*, and (c) shows the case of stepping up voltage of power outputted from the second step-up circuit, using a second DC input voltage detection value Vg.2 as a reference.

FIG. 9 is a schematic diagram showing how to calculate the step-up circuit voltage target value Vo*. In FIG. 9, (a) shows comparison between the inverter output voltage command value Vinv* and the first DC input voltage detection value Vg.1. In (a) of FIG. 9, the vertical axis indicates voltage and the horizontal axis indicates time.

The control processing unit 30 compares the first DC input voltage detection value Vg.1 and the absolute value of the inverter output voltage command value Vinv*, and employs the higher value. Therefore, a waveform of the step-up circuit voltage target value Vo* follows the inverter output voltage command value Vinv* during a period in which the absolute value of the inverter output voltage command value Vinv* is equal to or greater than the first DC input voltage detection value Vg.1, and follows the first DC input voltage detection value Vg.1 during a period in which the absolute value of the inverter output voltage command value Vinv* is equal to or smaller than the first DC input voltage detection value Vg.1.

In FIG. 9, (b) shows a waveform of the step-up circuit voltage target value Vo*. As shown in (b) of FIG. 9, the waveform of the step-up circuit voltage target value Vo* follows the absolute value of the inverter output voltage command value Vinv* during a period in which the inverter output voltage command value Vinv* is equal to or greater than the first DC input voltage detection value Vg.1, and follows the first DC input voltage detection value Vg.1 during a period in which the inverter output voltage command value Vinv* is equal to or smaller than the first DC input voltage detection value Vg.1.

Therefore, as shown in (b) of FIG. 9, since the minimum voltage value of the step-up circuit voltage target value Vo* is the first DC input voltage detection value Vg.1, the step-up circuit voltage target value Vo* always has greater voltage than the second DC input voltage detection value Vg.2, and is prevented from becoming lower than the first DC input voltage detection value Vg.1.

That is, the second step-up circuit 41 always performs step-up operation to output power having voltage according to the step-up circuit voltage target value Vo*.

For example, if power to be outputted from the second step-up circuit 41 is stepped up using the second DC input voltage detection value Vg.2 as a reference, power outputted from the second step-up circuit 41 has a lower voltage value than the first DC input voltage detection value Vg.1 in a range K in (c) of FIG. 9, and when power is supplied from only the first array 2, supply of power from the second array 40 is not obtained. Therefore, power supply efficiency of the arrays 2 and 40 might be reduced as a whole.

In this regard, in the present embodiment, as shown in (c) of FIG. 9, the second step-up circuit 41 is controlled so that a voltage value of power to be outputted from the second step-up circuit 41 substantially coincides with the first DC input voltage detection value Vg.1 in the range K in which the inverter output voltage command value Vinv* is equal to or smaller than the first DC input voltage detection value Vg.1. Therefore, the minimum voltage value of power outputted from the second step-up circuit 41 can be made to substantially coincide with the first DC input voltage detection value Vg.1.

Thus, the voltage value of power outputted from the second step-up circuit 41 can be prevented from becoming greatly lower than the voltage value of power outputted from the first step-up circuit 10. As a result, occurrence of the period K in which supply of power from the second array 40 through the second step-up circuit 41 is not obtained can be prevented, whereby reduction in power supply efficiency can be suppressed.

In the present embodiment, in order to calculate the step-up circuit current command value Iin.i* which is a current target value for each step-up circuit, as shown by the above expression (8), a power value of AC power outputted from the inverter circuit 11 is multiplied by a ratio of a power value of each of the step-up circuits 10 and 41 to a total power value obtained by summing powers of the step-up circuits 10 and 41, thereby obtaining the step-up circuit current command value Iin.i*. Therefore, current target values for the respective step-up circuits 10 and 41 can be obtained appropriately. As a result, the minimum voltage value of power outputted from the second step-up circuit 41 substantially coincides with the first DC input voltage detection value Vg.1.

If the first step-up circuit 10 is controlled based on the step-up circuit current command value Iin.1, the first step-up circuit 10 stops step-up operation during a period in which the inverter output voltage command value Vinv* is lower than the first DC input voltage detection value Vg.1, and performs step-up operation during a period in which the inverter output voltage command value Vinv* is higher than the first DC input voltage detection value Vg.1.

It is noted that a state in which a voltage value (second DC input voltage detection value Vg.2) of power outputted from the second step-up circuit 41 substantially coincides with the first DC input voltage detection value Vg.1 means a state in which these voltages coincide with each other to such a degree that, when powers are supplied from the first step-up circuit 10 and the second step-up circuit 41, the supply of powers can be obtained from both step-up circuits.

Figure 10:
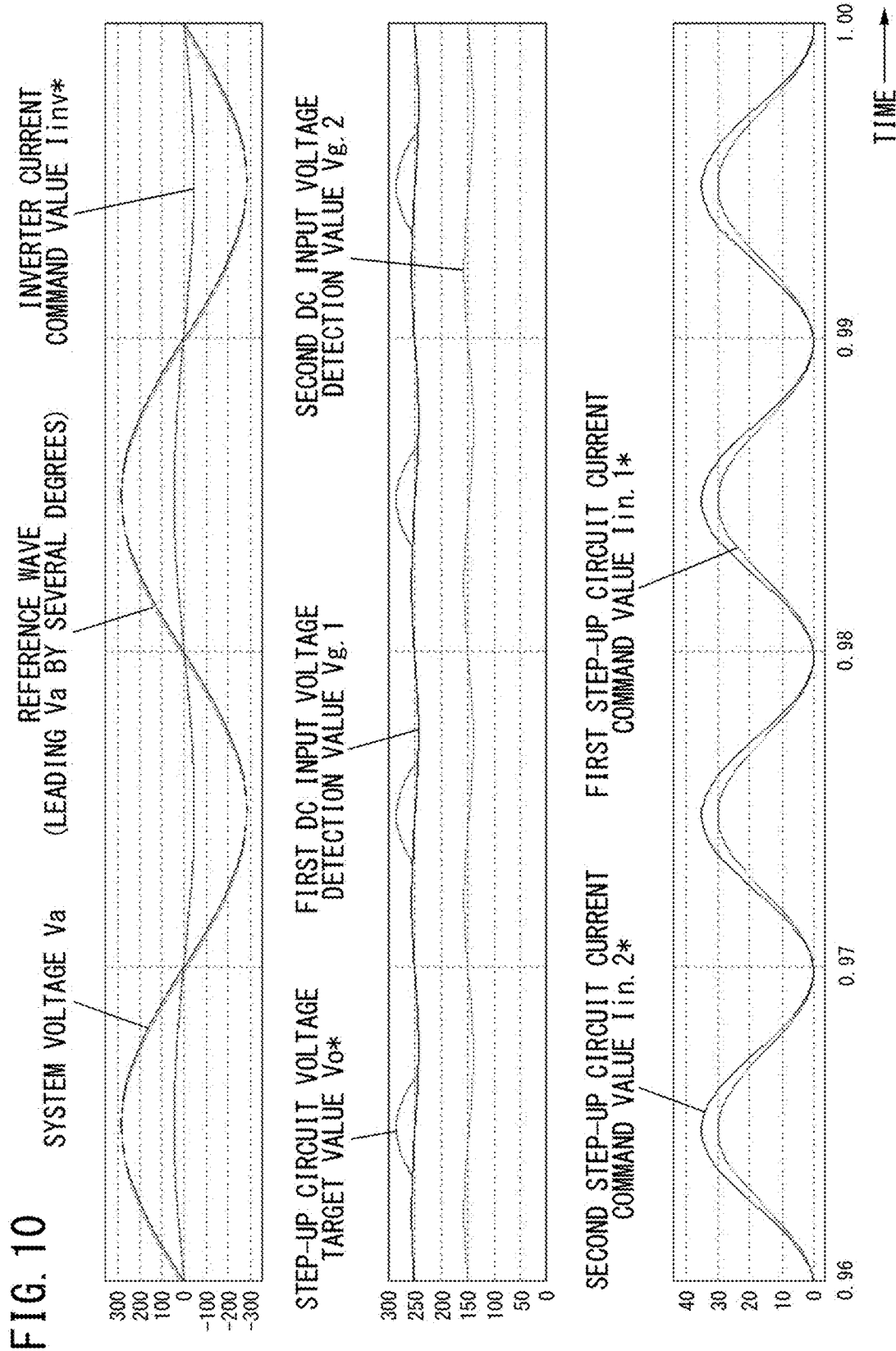
FIG. 10 is graphs showing a simulation result of temporal variations in the DC input voltage detection values Vg.1 and Vg.2 and the step-up circuit voltage target value Vo*, together with each command value, in which an upper graph shows a relationship between the inverter output voltage command value Vinv* and a system voltage detection value Va, a middle graph shows a relationship between the DC input voltage values Vg.1 and Vg.2 and the step-up circuit voltage target value Vo*, and a lower graph shows step-up circuit current command values Iin.1* and Iin.2* (the vertical axis for voltage indicates [V], and the vertical axis for current indicates [A]).

FIG. 10 is graphs showing a simulation result of temporal variations in the DC input voltage detection values Vg.1 and Vg.2 and the step-up circuit voltage target value Vo*, together with each command value.

In FIG. 10, an upper graph shows a relationship between the inverter output voltage command value Vinv* and the system voltage detection value Va, a middle graph shows a relationship between the DC input voltage values Vg.1 and Vg.2 and the step-up circuit voltage target value Vo*, and a lower graph shows the step-up circuit current command values Iin.1* and Iin.2*.

As shown in FIG. 10, it can be confirmed that a waveform of the step-up circuit voltage target value Vo* follows the absolute value of the inverter output voltage command value Vinv* during a period in which the inverter output voltage command value Vinv* is equal to or greater than the first DC input voltage detection value Vg.1, and follows the first DC input voltage detection value Vg.1 during a period in which the inverter output voltage command value Vinv* is equal to or smaller than the first DC input voltage detection value Vg.1.

[4 Control for First Step-Up Circuit and Inverter Circuit]

The first step-up circuit control unit 32 (FIG. 3) controls the switching element Qb1 of the first step-up circuit 10. The inverter circuit control unit 33 controls the switching elements Q1 to Q4 of the inverter circuit 11.

The first step-up circuit control unit 32 and the inverter circuit control unit 33 respectively generate a first step-up circuit carrier wave and an inverter circuit carrier wave, and respectively modulate these carrier waves with the first step-up circuit voltage reference value Vbc1# and the inverter voltage reference value Vinv# which are command values given from the control processing unit 30, to generate drive waveforms for driving each switching element.

The first step-up circuit control unit 32 and the inverter circuit control unit 33 control each switching element based on the drive waveforms, thereby causing the first step-up circuit 10 and the inverter circuit 11 to output AC powers having voltage waveforms approximate to a waveform of the inverter output voltage command value Vinv*.

Figure 11:
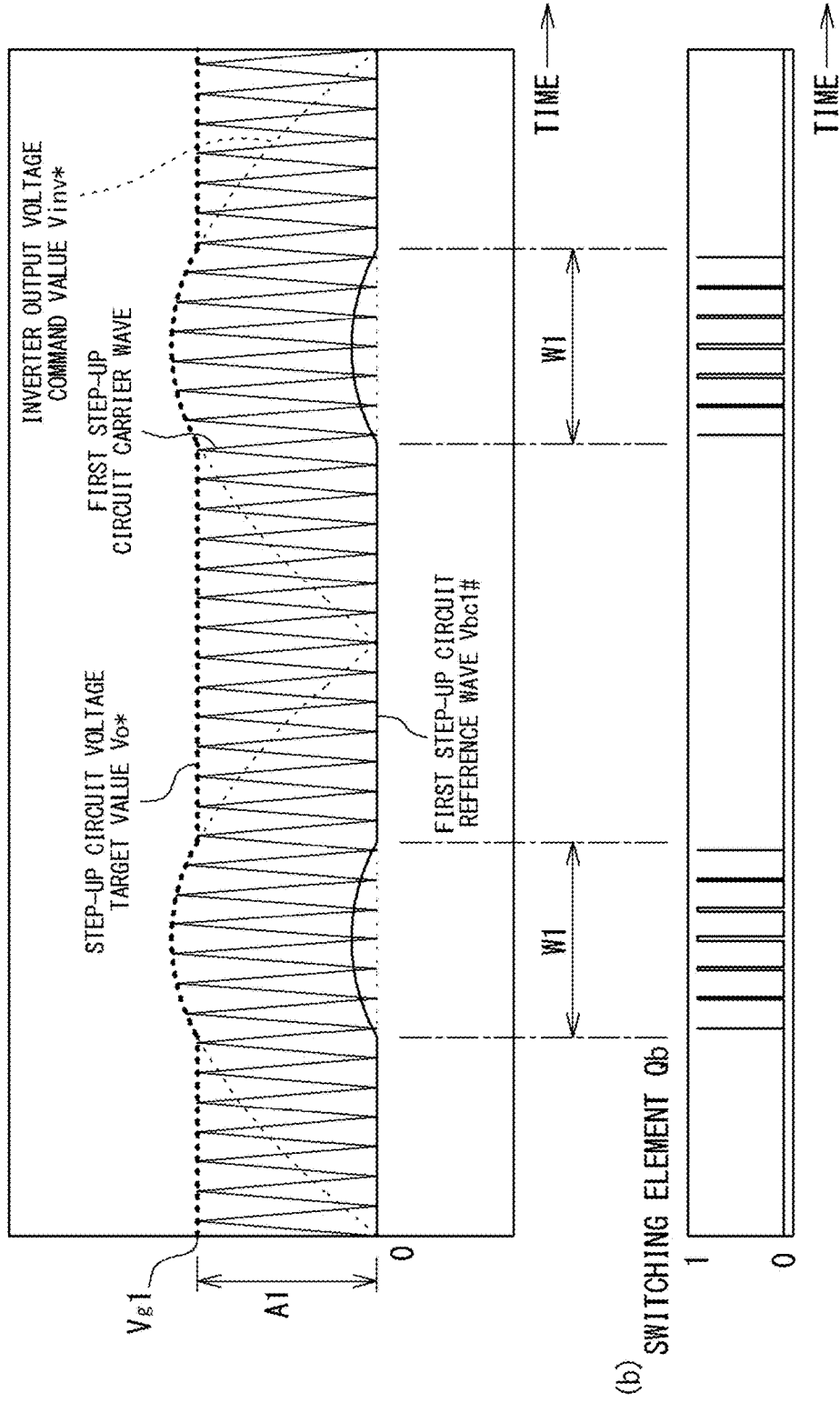
FIG. 11 is graphs in which (a) shows comparison between a first step-up circuit carrier wave and a waveform of a first step-up circuit voltage reference value Vbc1#, and (b) shows a drive waveform for driving a switching element, generated by a first step-up circuit control unit.

In FIG. 11, (a) is a graph showing comparison between the first step-up circuit carrier wave and a waveform of the first step-up circuit voltage reference value Vbc1#. In (a) of FIG. 11, the vertical axis indicates voltage and the horizontal axis indicates time. In (a) of FIG. 11, for facilitating the understanding, the wavelength of the first step-up circuit carrier wave is elongated as compared to the actual wavelength.

The step-up circuit carrier wave generated by the first step-up circuit control unit 32 is a triangle wave having a minimum value of "0", and has an amplitude A1 set at the step-up circuit voltage target value Vo* given from the control processing unit 30.

The frequency of the step-up circuit carrier wave is set by the step-up circuit control unit 32 in accordance with a control command from the control processing unit 30, so as to realize a predetermined duty cycle.

As described above, the step-up circuit voltage target value Vo* varies so as to follow an absolute value of the inverter output voltage command value Vinv* during a period W1 in which the absolute value of the inverter output voltage command value Vinv* is generally equal to or greater than the first DC input voltage detection value Vg.1, and follow the first DC input voltage detection value Vg.1 during the other period. Therefore, the amplitude A1 of the first step-up circuit carrier wave also varies in accordance with the step-up circuit voltage target value Vo*.

In the present embodiment, the first DC input voltage detection value Vg.1 is 250 volts, and the amplitude of voltage of the commercial power system 3 is 288 volts.

A waveform (hereinafter, may be referred to as a first step-up circuit reference wave Vbc1#) of the first step-up circuit voltage reference value Vbc1# corresponds to a value calculated based on the step-up circuit current command value Iin.1* by the control processing unit 30, and has a positive value during the period W1 in which the absolute value of the inverter output voltage command value Vinv* is greater than the first DC input voltage detection value Vg.1. During the period W1, the first step-up circuit reference wave Vbc1# has a waveform approximate to the shape of a waveform created by the step-up circuit voltage target value Vo*, and crosses the first step-up circuit carrier wave.

The first step-up circuit control unit 32 compares the first step-up circuit carrier wave with the first step-up circuit reference wave Vbc1#, and generates a drive waveform for driving the switching element Qb1 so as to be turned on during a period in which the first step-up circuit reference wave Vbc1# which is a target value for voltage between both ends of the DC reactor 15 is equal to or greater than the first step-up circuit carrier wave, and to be turned off during a period in which the first step-up circuit reference wave Vbc1# is equal to or smaller than the carrier wave.

In FIG. 11, (b) shows the drive waveform for driving the switching element Qb1, generated by the first step-up circuit control unit 32. In (b) of FIG. 11, the vertical axis indicates voltage and the horizontal axis indicates time. The horizontal axis in (b) of FIG. 11 coincides with that in (a) of FIG. 11.

The drive waveform indicates switching operation of the switching element Qb1. When the drive waveform is given to the switching element Qb1, the switching element Qb1 is caused to perform switching operation in accordance with the drive waveform. The drive waveform forms a control command to turn off the switching element when the voltage is 0 volts and turn on the switching element when the voltage is a plus voltage.

The first step-up circuit control unit 32 generates the drive waveform so that the switching operation is performed during the range W1 in which the absolute value of the voltage value of the inverter output voltage command value Vinv* is equal to or greater than the first DC input voltage detection value Vg.1. Therefore, in a range in which the absolute value is equal to or smaller than the first DC input voltage detection value Vg.1, the switching element Qb1 is controlled to stop the switching operation.

Each pulse width is determined by an intercept of the first step-up circuit carrier wave which is a triangle wave. Therefore, the pulse width is greater at a part where voltage is higher.

As described above, the first step-up circuit control unit 32 modulates the first step-up circuit carrier wave with the first step-up circuit reference wave Vbc1#, to generate the drive waveform representing pulse widths for switching. The first step-up circuit control unit 32 performs PWM control for the switching element Qb1 of the first step-up circuit 10, based on the generated drive waveform.

In the case where a switching element Qbu that conducts current in a forward direction of the diode 16 is provided in parallel with the diode 16, a drive waveform inverted from the drive waveform for the switching element Qb is used for the switching element Qbu. In order to prevent the switching element Qb and the switching element Qbu from conducting currents at the same time, a dead time of about 1 microsecond is provided at a part where a drive pulse for the switching element Qbu shifts from OFF to ON.

Figure 12:
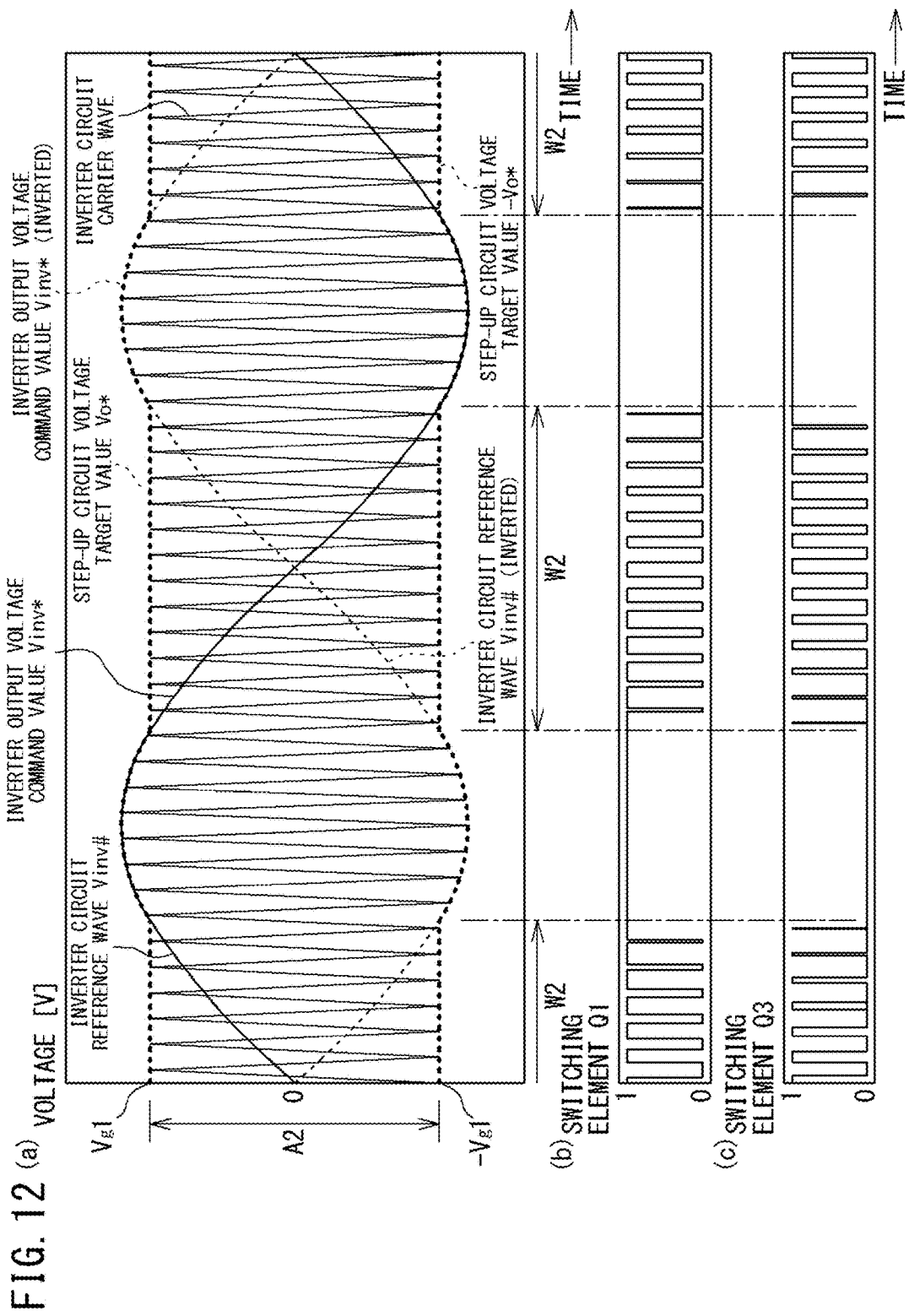
FIG. 12 is graphs in which (a) shows comparison between an inverter circuit carrier wave and a waveform of an inverter voltage reference value Vinv#, (b) shows a drive waveform for driving a switching element Q1, generated by an inverter circuit control unit, and (c) shows a drive waveform for driving a switching element Q3, generated by the inverter circuit control unit.

In FIG. 12, (a) is a graph showing comparison between the inverter circuit carrier wave and a waveform of the inverter voltage reference value Vinv#. In (a) of FIG. 12, the vertical axis indicates voltage and the horizontal axis indicates time. Also in (a) of FIG. 12, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the step-up circuit voltage target value Vo* (a voltage target value for the capacitor 23). Therefore, the inverter circuit carrier wave has a period in which an amplitude A2 thereof is twice (500 volts) as great as the first DC input voltage detection value Vg.1 and a period in which the amplitude A2 is twice (576 volts at maximum) as great as voltage of the commercial power system 3.

The frequency thereof is set by the inverter circuit control unit 33 in accordance with a control command from the control processing unit 30, or the like, so as to realize a predetermined duty cycle.

As described above, the step-up circuit voltage target value Vo* varies to follow an absolute value of the inverter output voltage command value Vinv* during the period W1 in which the absolute value of the inverter output voltage command value Vinv* is generally equal to or greater than the first DC input voltage detection value Vg.1, and follow the first DC input voltage detection value Vg.1 during the other period, i.e., a period W2. Therefore, the amplitude A2 of the inverter circuit carrier wave also varies in accordance with the step-up circuit voltage target value Vo*.

A waveform (hereinafter, may be referred to as an inverter circuit reference wave Vinv#) of the inverter voltage reference value Vinv# corresponds to a value calculated based on the inverter current command value Iinv* by the control processing unit 30, and is set to have generally the same amplitude as the voltage amplitude (288 volts) of the commercial power system 3. Therefore, the inverter circuit reference wave Vinv# crosses the inverter circuit carrier wave in a range where the voltage value is between −Vg.1 and +Vg.1.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# is equal to or greater than the inverter circuit carrier wave, and to be turned off during a period in which the inverter circuit reference wave Vinv# is equal to or smaller than the carrier wave.

In FIG. 12, (b) shows the drive waveform for driving the switching element Q1, generated by the inverter circuit control unit 33. In (b) of FIG. 12, the vertical axis indicates voltage and the horizontal axis indicates time. The horizontal axis in (b) of FIG. 12 coincides with that in (a) of FIG. 12.

The inverter circuit control unit 33 generates the drive waveform so that the switching operation is performed in the range W2 in which voltage of the inverter circuit reference wave Vinv# is between −Vg.1 and +Vg.1. Therefore, in the other range, the switching element Q1 is controlled to stop the switching operation.

In FIG. 12, (c) shows the drive waveform for driving the switching element Q3, generated by the inverter circuit control unit 33. In (c) of FIG. 12, the vertical axis indicates voltage and the horizontal axis indicates time.

The inverter circuit control unit 33 compares the carrier wave with a waveform indicated by a broken line in (a) of FIG. 12, which is inverted from the inverter circuit reference wave Vinv#, to generate the drive waveform for the switching element Q3.

Also in this case, the inverter circuit control unit 33 generates the drive waveform so that the switching operation is performed in the range W2 in which voltage of (a waveform inverted from) the inverter circuit reference wave Vinv# is between −Vg.1 and +Vg.1. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the inverter circuit 11, based on the generated drive waveforms.

The first step-up circuit control unit 32 of the present embodiment causes the first step-up circuit 10 to output power so that current flowing in the DC reactor 15 coincides with the step-up circuit current command value Iin.1*. As a result, the first step-up circuit 10 is caused to perform switching operation during the period W1 (FIG. 11) in which an absolute value of the inverter output voltage command value Vinv* is generally equal to or greater than the first DC input voltage detection value Vg.1. The first step-up circuit 10 outputs power having voltage equal to or greater than the first DC input voltage detection value Vg.1 and approximate to the absolute value of the inverter output voltage command value Vinv*, during the period W1. On the other hand, during the period in which the absolute value of the inverter output voltage command value Vinv* is generally equal to or smaller than the first DC input voltage detection value Vg.1, the step-up circuit control unit 32 stops the switching operation of the step-up circuit 10. Therefore, during the period in which the absolute value is equal to or smaller than the first DC input voltage detection value Vg.1, the first step-up circuit 10 outputs, to the inverter circuit 11, DC power outputted from the first array 2 without stepping up the voltage thereof.

The inverter circuit control unit 33 of the present embodiment causes the inverter circuit 11 to output power so that current flowing in the AC reactor 22 coincides with the inverter current command value Iinv*. As a result, the inverter circuit 11 is caused to perform switching operation during the range W2 (FIG. 12) in which the inverter output voltage command value Vinv* is generally between −Vg.1 and +Vg.1. That is, the inverter circuit 11 is caused to perform switching operation during a period in which an absolute value of voltage of the inverter output voltage command value Vinv* is equal to or smaller than the first DC input voltage detection value Vg.1.

Therefore, while switching operation of the first step-up circuit 10 is stopped, the inverter circuit 11 performs switching operation to output AC voltage approximate to the inverter output voltage command value Vinv*.

On the other hand, in the period other than the period W2 in which voltage of the inverter output voltage command value Vinv* is generally between −Vg.1 and +Vg.1, the inverter circuit control unit 33 stops the switching operation of the inverter circuit 11. During this period, power stepped up by the first step-up circuit 10 is given to the inverter circuit 11. Therefore, the inverter circuit 11 whose switching operation is stopped outputs the power given from the first step-up circuit 10, without stepping down the voltage thereof.

That is, the inverter device 1 of the present embodiment causes the first step-up circuit 10 and the inverter circuit 11 to perform switching operations so as to be alternately switched therebetween, and superimposes their respective output powers on each other, thereby outputting AC power having a voltage waveform approximate to the inverter output voltage command value Vinv*.

As described above, in the present embodiment, control is performed so that the first step-up circuit 10 is operated in the case of outputting voltage corresponding to the part where voltage of AC power to be outputted from the inverter device 1 is higher than the first DC input voltage detection value Vg.1, and the inverter circuit 11 is operated in the case of outputting voltage corresponding to the part where the voltage of the AC power is lower than the first DC input voltage detection value Vg.1. Therefore, since the inverter circuit 11 does not step down the power that has been stepped up by the first step-up circuit 10, a potential difference in stepping down of the voltage can be reduced, whereby loss due to switching of the step-up circuit is reduced and AC power can be outputted with increased efficiency.

Further, for both the first step-up circuit 10 and the inverter circuit 11, the inverter output voltage command value Vinv* is calculated based on the inverter current command value Iinv* set by the control unit 12, occurrence of deviation or distortion between power of the step-up circuit and power of the inverter circuit which are outputted so as to be alternately switched can be suppressed.

The first step-up circuit control unit 32 of the control processing unit 30 may control the first step-up circuit 10 so as to operate in a range higher than a voltage value slightly lower than the first DC input voltage detection value Vg.1, and to stop switching operation in a range equal to or smaller than the voltage value slightly lower than the first DC input voltage detection value Vg.1.

In this case, a period in which power outputted from the first step-up circuit 10 and power outputted from the inverter circuit 11 are superimposed on each other is intentionally provided, whereby current waveforms can be smoothly connected at a part where the first step-up circuit 10 and the inverter circuit 11 are switched to each other.

Here, the voltage value slightly lower than the first DC input voltage detection value Vg.1 means a voltage value set so as to allow for smooth connection between the current waveform outputted from the first step-up circuit 10 and the current waveform outputted from the inverter circuit 11, that is, a voltage value set to be lower than the first DC input voltage detection value Vg.1 so that output of the first step-up circuit 10 and output of the inverter circuit 11 are superimposed on each other to a degree required for smooth connection between both current waveforms.

Figure 13:
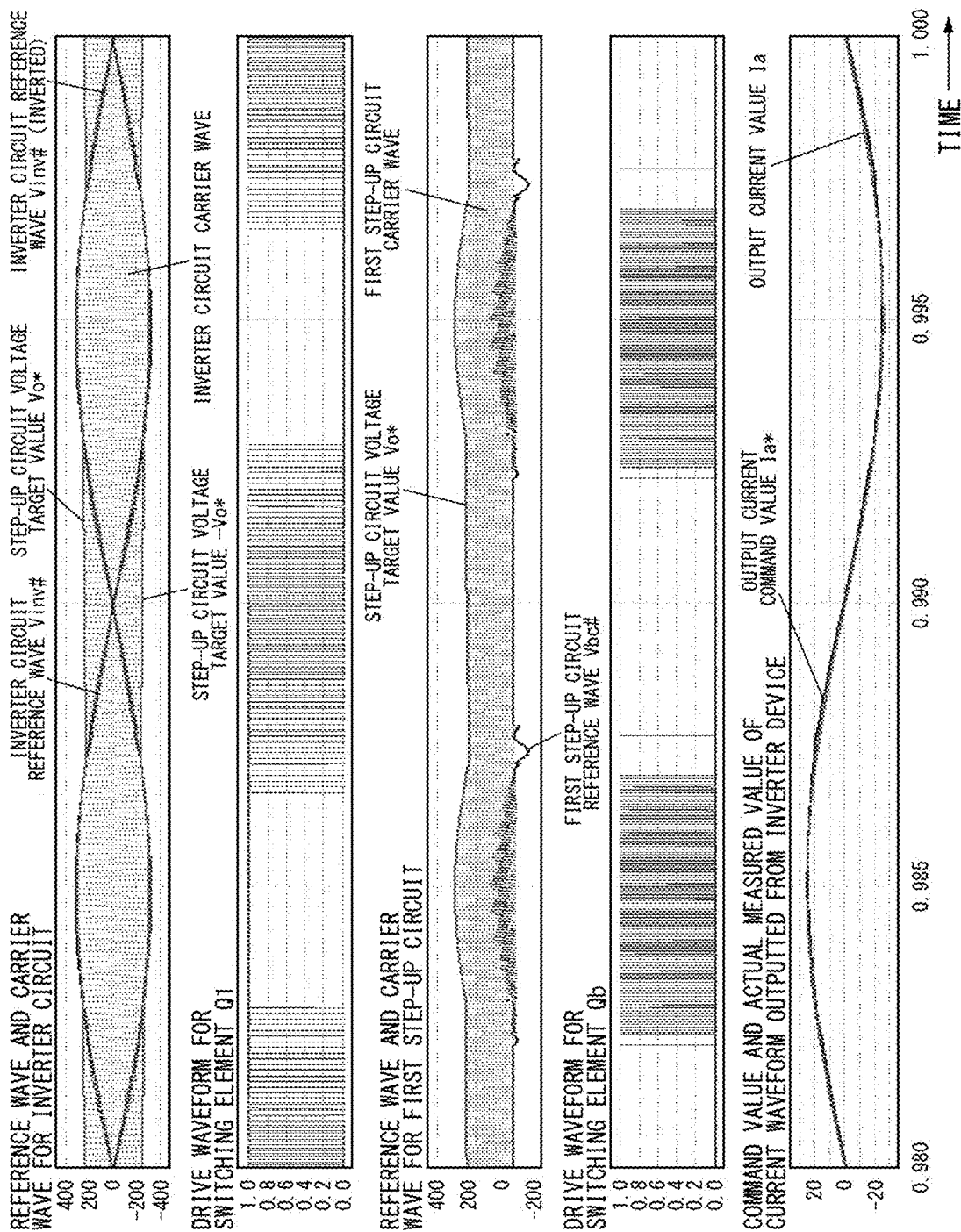
FIG. 13 is a diagram showing examples of reference waves and drive waveforms for switching elements (the vertical axis for voltage indicates [V], and the vertical axis for current indicates [A]).

FIG. 13 is a diagram showing examples of reference waves and drive waveforms for the switching elements Qb and Q1 to Q4.

FIG. 13 shows graphs of, from the uppermost side, the reference wave Vinv# and the carrier wave for the inverter circuit, the drive waveform for the switching element Q1, the reference wave Vbc1# and the carrier wave for the first step-up circuit, the drive waveform for the switching element Qb, and the command value and an actual measured value of a current waveform of AC power outputted from the inverter device 1. The horizontal axes of these graphs indicate time, and coincide with each other.

As shown in FIG. 13, it is found that output current is controlled so that an actual measured value Ia thereof coincides with a command value Ia*.

In addition, it is found that the period in which the switching element Qb1 of the first step-up circuit 10 performs switching operation and the period in which the switching elements Q1 to Q4 of the inverter circuit 11 perform switching operations are controlled so as to be alternately switched therebetween.

[5 Control for Second Step-Up Circuit]

The second step-up circuit control unit 35 (FIG. 3) controls the switching element Qb2 of the second step-up circuit 41.

The second step-up circuit control unit 35 generates a second step-up circuit carrier wave, and modulates this carrier wave with the second step-up circuit voltage reference value Vbc2# given from the control processing unit 30, to generate a drive waveform for driving the switching element Qb2.

The second step-up circuit control unit 35 and the inverter circuit control unit 33 control each switching element based on the drive waveforms, thereby causing the inverter circuit 11 to output AC power having a voltage waveform approximate to a waveform of the inverter output voltage command value Vinv*.

Figure 14:
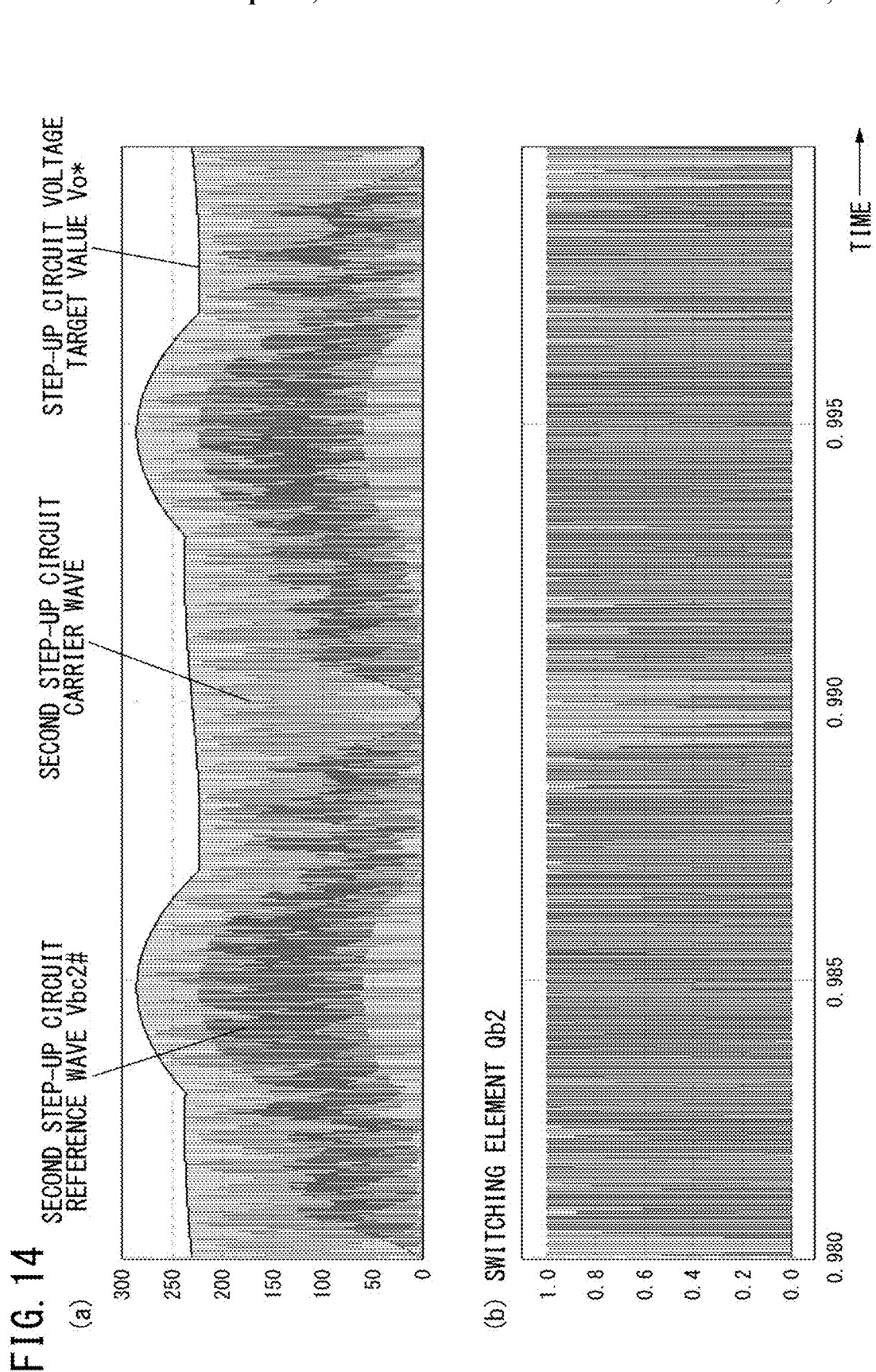
FIG. 14 is graphs in which (a) shows comparison between a second step-up circuit carrier wave and a waveform of a second step-up circuit voltage reference value Vbc2# (the vertical axis for voltage indicates [V]), and (b) shows a drive waveform for driving a switching element, generated by a second step-up circuit control unit.

In FIG. 14, (a) is a graph showing comparison between the second step-up circuit carrier wave and a waveform of the second step-up circuit voltage reference value Vbc2#. In (a) of FIG. 14, the vertical axis indicates voltage and the horizontal axis indicates time.

The second step-up circuit carrier wave generated by the second step-up circuit control unit 5 is a triangle wave and has an amplitude set at the same value (amplitude A1) as the voltage amplitude of the step-up circuit voltage target value Vo*. The frequency of the second step-up circuit carrier wave is set by the second step-up circuit control unit 35 in accordance with a control command from the control processing unit 30, or the like, so as to realize a predetermined duty cycle.

In the present embodiment, the second DC input voltage detection value Vg.2 is 150 volts.

As described above, the step-up circuit voltage target value Vo* varies so as to follow an absolute value of the inverter output voltage command value Vinv* during a period in which the absolute value of the inverter output voltage command value Vinv* is generally equal to or greater than the first DC input voltage detection value Vg.1, and follow the first DC input voltage detection value Vg.1 during the other period. Therefore, the amplitude of the second step-up circuit carrier wave also varies in accordance with the step-up circuit voltage target value Vo*.

A waveform (hereinafter, may be referred to as a second step-up circuit reference wave Vbc2#) of the second step-up circuit voltage reference value Vbc2# corresponds to a value calculated based on the step-up circuit current command value Iin.2* by the control processing unit 30, and has almost a positive value over the entire range, unlike the first step-up circuit reference wave Vbc1#. Therefore, the second step-up circuit voltage reference value Vbc#2 crosses almost the entire range of the second step-up circuit carrier wave.

The second step-up circuit control unit 35 compares the second step-up circuit carrier wave with the second step-up circuit voltage reference value Vbc2#, and generates a drive waveform for driving the switching element Qb2 so as to be turned on during a period in which the second step-up circuit voltage reference wave Vbc2# is equal to or greater than the second step-up circuit carrier wave, and to be turned off during a period in which the second step-up circuit reference wave Vbc2# is equal to or smaller than the second step-up circuit carrier wave.

In FIG. 14, (b) shows the drive waveform for driving the switching element Qb2, generated by the second step-up circuit control unit 35. In (b) of FIG. 14, the vertical axis indicates voltage and the horizontal axis indicates time. The horizontal axis in (b) of FIG. 14 coincides with that in (a) of FIG. 14.

The second step-up circuit voltage reference value Vbc2# crosses almost the entire range of the second step-up circuit carrier wave as described above. Therefore, the second step-up circuit control unit 35 generates a drive waveform so as to cause the switching element Qb2 to perform switching operation over the entire range.

As described above, the second step-up circuit control unit 35 modulates the second step-up circuit carrier wave with the second step-up circuit voltage reference value Vbc2#, to generate the drive waveform representing pulse widths for switching. The second step-up circuit control unit 35 performs PWM control for the switching element Qb2 of the second step-up circuit 41, based on the generated drive waveform.

While being controlled based on the above drive waveform, the second step-up circuit 41 outputs a current waveform approximate to the second step-up circuit current command value Iin2* Thus, the minimum voltage value of power outputted from the second step-up circuit 41 substantially coincides with the first DC input voltage detection value Vg.1 (see (b) in FIG. 9), whereby the voltage value of power outputted from the second step-up circuit 41 can be prevented from becoming greatly lower than the voltage value of power outputted from the first step-up circuit 10. As a result, occurrence of the period in which supply of power from the second array 40 through the second step-up circuit 41 is not obtained can be prevented, whereby reduction in power supply efficiency can be suppressed.

Voltage of power given from the second step-up circuit 41 to the inverter circuit 11 substantially coincides with voltage of power given from the first step-up circuit 10 to the inverter circuit 11 (power stepped up by the first step-up circuit 10 and DC power outputted from the first array 2). Therefore, power to be given from the second step-up circuit 41 to the inverter circuit 11 is superimposed on power to be given from the first step-up circuit 10 to the inverter circuit 11, and then the resultant power is given to the inverter circuit 11.

Based on the powers given from both step-up circuits 10 and 41, the inverter circuit 11 outputs AC power having a voltage waveform approximate to the inverter output voltage command value Vinv* as described above.

[6 Current Phase of Outputted AC Power]

Both step-up circuits 10 and 41 and the inverter circuit 11 of the present embodiment output AC power having a voltage waveform approximate to the inverter output voltage command value Vinv*, to the filter circuit 21 connected at the subsequent stage, through the control by the control unit 12. The inverter device 1 outputs AC power to the commercial power system 3 via the filter circuit 21.

Here, the inverter output voltage command value Vinv* is generated by the control processing unit 30 so as to have a voltage phase leading the voltage phase of the commercial power system 3 by several degrees as described above.

Therefore, AC voltage outputted by both step-up circuits 10 and 41 and the inverter circuit 11 also has a voltage phase leading the voltage phase of the commercial power system 3 by several degrees.

As a result, the AC voltage from both step-up circuits 10 and 41 and the inverter circuit 11 is applied to one end of the AC reactor 22 (FIG. 2) of the filter circuit 21, and voltage of the commercial power system 3 is applied to the other end. Thus, voltages having phases shifted from each other by several degrees are applied to the respective ends of the AC reactor 22.

Figure 15:
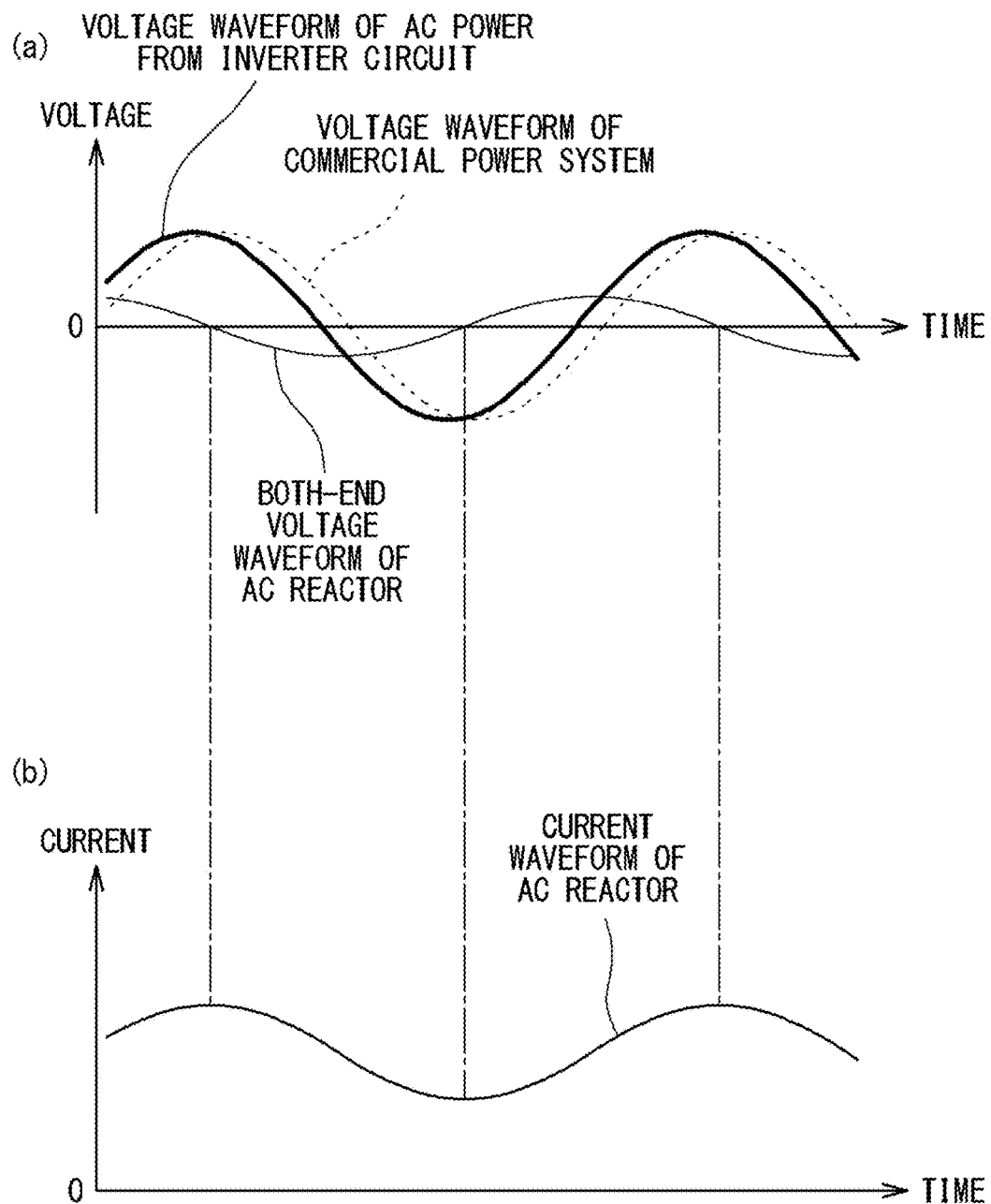
FIG. 15 is graphs in which (a) shows voltage waveforms of AC voltage outputted from the inverter circuit, a commercial power system, and voltage between both ends of an AC reactor, and (b) shows a waveform of current flowing in the AC reactor.

In FIG. 15, (a) is a graph showing voltage waveforms of AC voltage outputted from the inverter circuit 11, the commercial power system 3, and voltage between both ends of the AC reactor 22. In (a) of FIG. 15, the vertical axis indicates voltage and the horizontal axis indicates time.

As shown in (a) of FIG. 15, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 15, the phase of voltage between both ends of the AC reactor 22 leads the phase of voltage of the commercial power system 3 by 90 degrees.

In FIG. 15, (b) is a graph showing a waveform of current flowing in the AC reactor 22. In (b) of FIG. 15, the vertical axis indicates current and the horizontal axis indicates time. The horizontal axis in (b) of FIG. 15 coincides with that in (a) of FIG. 15.

The current phase of the AC reactor 22 lags the voltage phase thereof by 90 degrees. Therefore, as shown in (b) of FIG. 15, the current phase of AC power outputted through the AC reactor 22 is synchronized with the current phase of the commercial power system 3.

Therefore, although the phase of voltage outputted from the inverter circuit 11 leads the phase of the commercial power system 3 by several degrees, the phase of current outputted from the inverter circuit 11 coincides with the phase of current of the commercial power system 3.

Therefore, the phase of a current waveform of AC power outputted from the inverter device 1 coincides with the voltage phase of the commercial power system 3.

As a result, AC power in phase with voltage of the commercial power system 3 can be outputted.

[7 Others]

The present invention is not limited to the above embodiment. In the above embodiment, an example in which two solar battery arrays, i.e., the first array 2 and the second array 40 are connected in parallel to the inverter circuit 11 has been shown. However, for example, more solar battery arrays may be connected, and more step-up circuits to which the solar battery arrays are connected may be connected. In this case, among the more solar battery arrays connected, a solar battery array that outputs power having the highest voltage value can be used as the first array 2 of the above embodiment, and other arrays can be used as the second array 40 of the above embodiment.

Also in this case, a voltage value at an optimum operation point of a solar battery array having the highest voltage value is used as a first input voltage set value Vset1, and other solar battery arrays are controlled so that the minimum voltage value of power outputted from the other solar battery arrays substantially coincides with the first input voltage set value Vset1.

Also in this case, occurrence of the period in which supply of powers from the more second arrays is not obtained can be prevented, whereby reduction in efficiency of the inverter device 1 can be suppressed.

In the above embodiment, the amplitudes of the carrier waves for the inverter circuit, the first step-up circuit, and the second step-up circuit are set at the step-up circuit voltage target value Vo*. However, a voltage sensor for detecting voltage between both ends of the capacitor 19 may be provided to obtain a step-up circuit voltage detection value Vo, and the control may be performed using the step-up circuit voltage detection value Vo.

In this case, the step-up circuit voltage detection value Vo can be used as the amplitude of each carrier wave. Thus, even when the system voltage or output voltage of the DC power supply varies, AC current with reduced distortion can be outputted.

[8 Supplementary Note]

It has been verified that the same result as in each simulation in the above embodiments can be obtained using an actual machine.

It is noted that the embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST 1 inverter device
2 first solar battery array/first array (first power supply)
3 commercial power system
10 first step-up circuit
11 inverter circuit
12 control unit
15 DC reactor
16 diode
17 voltage sensor
18 current sensor
19 capacitor
21 filter circuit
22 AC reactor
23 capacitor
24 current sensor
25 voltage sensor
26 capacitor
30 control processing unit
32 first step-up circuit control unit
33 inverter circuit control unit
34 averaging processing unit
35 second step-up circuit control unit
40 second solar battery array/second array (second power supply)
41 second step-up circuit
42 DC reactor
43 diode
44 voltage sensor
45 current sensor
46 capacitor
51 first calculation section
52 first adder
53 compensator
54 second adder
61 second calculation section
62 third adder
63 compensator
64 fourth adder
72 fifth adder
73 compensator
74 sixth adder
Qb1, Qb2 switching element
Q1 to Q4 switching element

The invention claimed is:

1. An inverter device including a circuit configuration for converting, to AC power, DC powers respectively given from a first power supply and a second power supply which outputs power with voltage lower than that of the first power supply, the inverter device comprising:
a first step-up circuit configured to step up voltage of the DC power given from the first power supply;
a second step-up circuit configured to step up voltage of the DC power given from the second power supply;
an inverter circuit connected to both step-up circuits connected in parallel to each other, the inverter circuit configured to convert powers given from both step-up circuits to AC power; and
a control unit configured to multiply a power value including the AC power outputted from the inverter circuit, by a ratio of a power value of the DC power of each step-up circuit to a total power value obtained by summing the DC powers of both step-up circuits, and set a current target value for each step-up circuit based on a value obtained by the multiplication, wherein
the control unit is adapted to let the first step-up circuit and the inverter circuit alternately have a period in which high-frequency switching operation is stopped within a half cycle of the AC waveform, and set a step-up circuit voltage target value commonly used for both the first step-up circuit and the second step-up circuit, and
even when the first step-up circuit stops the high-frequency switching operation, the control unit causes the second step-up circuit to perform the high-frequency switching operation to thereby output the step-up circuit voltage target value.

2. The inverter device according to claim 1, wherein
a smoothing capacitor is provided between each of the first step-up circuit and the second step-up circuit, and the inverter circuit, and
the power value including the AC power outputted from the inverter circuit also includes reactive power passing through the smoothing capacitor.

3. The inverter device according to claim 1, wherein
a smoothing capacitor is provided between each of the first step-up circuit and the second step-up circuit, and the inverter circuit, and
the power value including the AC power outputted from the inverter circuit also includes reactive power passing through the smoothing capacitor and power loss in the inverter device.

4. The inverter device according to claim 1, wherein
in the case where a number corresponding to the "first" or the "second" is i (=1, 2), the current target value for each step-up circuit is $Iin.i^*$, a current target value for the inverter circuit is $Iinv^*$, a voltage target value for the inverter circuit is $Vinv^*$, a DC input voltage value from each power supply is $Vg.i$, an input current command value for each DC power is Ig.i*, and a notation "< >" indicates an average value of a value in brackets, the following expression is satisfied:

$$Iin.i^* = (Iinv^* \times Vinv^*) \times Ig.i^* / \Sigma \langle Ig.i^* \times Vg.i \rangle.$$

5. The inverter device according to claim 2, wherein
in the case where a number corresponding to the "first" or the "second" is i (=1, 2), the current target value for each step-up circuit is Iin.i*, a current target value for the inverter circuit is Iinv*, a voltage target value for the inverter circuit is Vinv*, an electrostatic capacitance of the smoothing capacitor is Co, a voltage target value commonly used for both step-up circuits is Vo*, a DC input voltage value from each power supply is Vg.i, an input current command value for each DC power is Ig.i*, and a notation "< >" indicates an average value of a value in brackets, the following expression is satisfied:

$$Iin.i^* = ((Iinv^* \times Vinv^*) + (Co \times dVo^*/dt) \times Vo^*) \times Ig.i^* / \Sigma \langle Ig.i^* \times Vg.i \rangle.$$

6. The inverter device according to claim 2, wherein
in the case where a number corresponding to the "first" or the "second" is i (=1, 2), the current target value for each step-up circuit is Iin.i*, a current target value for the inverter circuit is Iinv*, a voltage target value for the inverter circuit is Vinv*, a voltage target value commonly used for both step-up circuits is Vo*, a DC input voltage value from each power supply is Vg.i, an input current command value for each DC power is Ig.i*, current flowing through the smoothing capacitor is Ico, and a notation "< >" indicates an average value of a value in brackets, the following expression is satisfied:

$$Iin.i^* = ((Iinv^* \times Vinv^*) + Ico \times Vo^*) \times Ig.i^* / \Sigma \langle Ig.i^* \times Vg.i \rangle.$$

7. The inverter device according to claim 3, wherein
in the case where a number corresponding to the "first" or the "second" is i (=1, 2), the current target value for each step-up circuit is Iin.i*, a current target value for the inverter circuit is Iinv*, a voltage target value for the inverter circuit is Vinv*, an electrostatic capacitance of the smoothing capacitor is Co, a voltage target value commonly used for both step-up circuits is Vo*, a DC input voltage value from each power supply is Vg.i, an input current command value for each DC power is Ig.i*, power loss of the inverter device is $P_{LOSS}$, and a notation "< >" indicates an average value of a value in brackets, the following expression is satisfied:

$$Iin.i^* = ((Iinv^* \times Vinv^*) + (Co \times dVo^*/dt) \times Vo^* + P_{LOSS}) \times Ig.i^* / \Sigma \langle Ig.i^* \times Vg.i \rangle.$$

8. The inverter device according to claim 3, wherein
in the case where a number corresponding to the "first" or the "second" is i (=1, 2), the current target value for each step-up circuit is Iin.i*, a current target value for the inverter circuit is Iinv*, a voltage target value for the inverter circuit is Vinv*, a voltage target value commonly used for both step-up circuits is Vo*, a DC input voltage value from each power supply is Vg.i, an input current command value for each DC power is Ig.i*, current flowing through the smoothing capacitor is Ico, power loss of the inverter device is $P_{LOSS}$, and a notation "< >" indicates an average value of a value in brackets, the following expression is satisfied:

$$Iin.i^* = ((Iinv^* \times Vinv^*) + Ico \times Vo^* + P_{LOSS}) \times Ig.i^* / \Sigma \langle Ig.i^* \times Vg.i \rangle.$$

9. The inverter device according to claim 1, wherein
the inverter circuit outputs the converted AC power to an AC system via a reactor connected to an output end of the inverter circuit, and
the control unit controls the inverter circuit to output the AC power having a voltage phase leading a voltage phase of the AC system by several degrees.

10. The inverter device according to claim 1, wherein
the control unit controls each step-up circuit and the inverter circuit so that a current phase of AC power outputted from the inverter device becomes the same as the voltage phase of an AC system, and sets a voltage target value for the inverter circuit based on a current target value for controlling the inverter circuit so that the current phase of the AC power outputted from the inverter device becomes the same as the voltage phase of the AC system.

11. The inverter device according to claim 1, wherein
the control unit controls the first step-up circuit to stop step-up operation thereof when a voltage target value for the inverter circuit is equal to or smaller than the DC input voltage value or becomes a voltage value slightly smaller than the input voltage value, and
the control unit controls the inverter circuit to stop conversion operation thereof when the voltage target value is equal to or greater than the DC input voltage value.

12. The inverter device according to claim 1, wherein
the control unit uses, as the DC input voltage value, an average value calculated from a result of plural measurements of a voltage value of the DC power given from the first power supply.

13. The inverter device according to claim 12, wherein
the control unit further has a function of:
calculating average values of a current value of the first power supply, a voltage value of the second power supply, and a current value of the second power supply from results of plural measurements of the DC powers given from the first power supply and the second power supply; and
performing maximum power point tracking control for the first power supply and the second power supply based on the DC input voltage value and each average value.

14. The inverter device according to claim 13, wherein
the inverter circuit outputs the converted AC power to an AC system, and
the DC input voltage value and the average values are obtained from results of plural measurements of a voltage value and a current value of each DC power performed, during a period that is an integer multiple of a half cycle of the AC system, at time intervals shorter than the half cycle of the AC system.

15. The inverter device according to claim 13, wherein
the DC input voltage value and the average values are obtained from results of plural measurements of a voltage value and a current value of each DC power performed, during a period that is an integer multiple of a half cycle of the AC power converted by the converter inverter circuit, at time intervals shorter than the half cycle of the AC power.

16. The inverter device according to claim 1, wherein
a plurality of the second power supplies, and a plurality of the second step-up circuits to which the second power supplies are connected, are provided.

17. An inverter device including a circuit configuration for converting, to AC power, DC powers respectively given from a first power supply and a second power supply which outputs power with voltage lower than that of the first power supply, the inverter device comprising:
- a first step-up circuit configured to step up voltage of the DC power given from the first power supply;
- a second step-up circuit configured to step up voltage of the DC power given from the second power supply;
- an inverter circuit connected to both step-up circuits connected in parallel to each other, the inverter circuit configured to convert powers given from both step-up circuits to AC power; and
- a control unit configured to control the first step-up circuit, the second step-up circuit and the inverter circuit, wherein
- the control unit is adapted to let the first step-up circuit and the inverter circuit alternately have a period in which high-frequency switching operation is stopped within a half cycle of the AC waveform, and set a step-up circuit voltage target value commonly used for both the first step-up circuit and the second step-up circuit, and
- even when the first step-up circuit stops the high-frequency switching operation, the control unit causes the second step-up circuit to perform the high-frequency switching operation to thereby output the step-up circuit voltage target value.

18. The inverter device according to claim 17, wherein
in a range in which a voltage target value for the first step-up circuit is equal to or smaller than the DC input voltage value of the first step-up circuit, a voltage value of the power outputted from the second step-up circuit coincides with the DC input voltage value of the first step-up circuit, within the voltage-drop range of the first step-up circuit.

19. The inverter device according to claim 1, wherein DC power is outputted from an AC system to each power supply.

20. The inverter device according to claim 17, wherein a minimum voltage value of the power outputted from the second step-up circuit coincides with a DC input voltage value which is a voltage value of the DC power given from the first power supply, within a voltage-drop range of the first step-up circuit.

* * * * *